US012762785B2

(12) United States Patent
Chou et al.

(10) Patent No.: US 12,762,785 B2
(45) Date of Patent: Oct. 13, 2026

(54) LEARNED VOLUMETRIC ATTRIBUTE COMPRESSION USING COORDINATE-BASED NETWORKS

(71) Applicant: Google LLC, Mountain View, CA (US)

(72) Inventors: Philip Andrew Chou, Bellevue, WA (US); Berivan Isik, Stanford, CA (US); Sung Jin Hwang, Mountain View, CA (US); Nicholas Milo Johnston, Elk Grove, CA (US); George Dan Toderici, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 272 days.

(21) Appl. No.: 18/398,009

(22) Filed: Dec. 27, 2023

(65) Prior Publication Data

US 2024/0144583 A1 May 2, 2024

Related U.S. Application Data

(63) Continuation of application No. 17/708,628, filed on Mar. 30, 2022, now Pat. No. 11,900,525.

(Continued)

(51) Int. Cl.

*G06T 15/08* (2011.01)
*H04N 19/176* (2014.01)
*H04N 19/46* (2014.01)

(52) U.S. Cl.

CPC ........... *G06T 15/08* (2013.01); *H04N 19/176* (2014.11); *H04N 19/46* (2014.11)

(58) Field of Classification Search

CPC ......... G06T 15/08; G06T 9/001; G06T 9/002; H04N 19/176; H04N 19/46; H04N 19/96; H04N 19/50

See application file for complete search history.

(56) References Cited

U.S. PATENT DOCUMENTS

| | | | |
|---|---|---|---|
| 10,223,810 | B2 | 3/2019 | Chou et al. |
| 10,599,623 | B2 | 3/2020 | Riggs et al. |

(Continued)

OTHER PUBLICATIONS

Martel et al., "ACORN: Adaptive Coordinate Networks for Neural Scene Representation", arXiv:2105.02788v1, May 6, 2021, 18 pages.

(Continued)

*Primary Examiner* — Motilewa Good-Johnson

(74) *Attorney, Agent, or Firm* — DORITY & MANNING, P.A.

(57) ABSTRACT

Example embodiments of the present disclosure relate to systems and methods for compressing attributes of volumetric and hypervolumetric datasets. An example system performs operations including obtaining a reference dataset comprising attributes indexed by a domain of multidimensional coordinates; subdividing the domain into a plurality of blocks respectively associated with a plurality of attribute subsets; inputting, to a local nonlinear operator, a latent representation for an attribute subset associated with at least one block of the plurality of blocks; obtaining, using the local nonlinear operator and based on the latent representation, an attribute representation of one or more attributes of the attribute subset; and updating the latent representation based on a comparison of the attribute representation and the reference dataset.

20 Claims, 12 Drawing Sheets

Related U.S. Application Data

(60) Provisional application No. 63/309,699, filed on Feb. 14, 2022.

(56) References Cited

U.S. PATENT DOCUMENTS

| | | | | |
|---|---|---|---|---|
| 11,900,525 | B2* | 2/2024 | Chou | G06T 9/002 |
| 12,014,446 | B2* | 6/2024 | Koh | G06F 18/213 |
| 12,026,626 | B1* | 7/2024 | Pardeshi | G06N 3/048 |
| 12,456,229 | B2* | 10/2025 | Tang | G06T 17/30 |
| 12,475,604 | B2* | 11/2025 | Fidler | G06T 7/11 |
| 2017/0249401 | A1* | 8/2017 | Eckart | G06V 10/7625 |
| 2019/0087979 | A1* | 3/2019 | Mammou | H04N 19/597 |
| 2019/0122393 | A1* | 4/2019 | Sinharoy | G06T 15/04 |
| 2020/0099954 | A1* | 3/2020 | Hemmer | G06T 9/001 |
| 2020/0111237 | A1* | 4/2020 | Tourapis | G06T 9/001 |
| 2020/0221125 | A1* | 7/2020 | Budagavi | H04N 19/172 |
| 2020/0381022 | A1* | 12/2020 | Ilola | G11B 27/102 |
| 2021/0042964 | A1* | 2/2021 | Yeung | G06N 3/08 |
| 2021/0150228 | A1* | 5/2021 | Goforth | B60W 60/00272 |
| 2021/0217203 | A1* | 7/2021 | Kim | G06T 9/001 |
| 2021/0287430 | A1* | 9/2021 | Li | G06T 7/74 |
| 2021/0335039 | A1* | 10/2021 | Jones | G06V 10/82 |
| 2021/0407142 | A1* | 12/2021 | Hur | H04N 19/30 |
| 2021/0407148 | A1* | 12/2021 | Flynn | H04N 19/1883 |
| 2022/0067983 | A1* | 3/2022 | Fidler | G06N 3/09 |
| 2022/0094982 | A1* | 3/2022 | Iguchi | G06T 9/40 |
| 2022/0101144 | A1* | 3/2022 | Vahdat | G06N 3/0464 |
| 2022/0239956 | A1* | 7/2022 | Tourapis | G06T 9/001 |
| 2022/0327851 | A1* | 10/2022 | Flagg | G06F 16/55 |
| 2022/0398697 | A1* | 12/2022 | Vahdat | G06N 3/0464 |
| 2023/0075442 | A1* | 3/2023 | Ma | G06N 3/0495 |
| 2023/0080133 | A1* | 3/2023 | Meier | G08G 1/166<br>382/103 |
| 2023/0124868 | A1* | 4/2023 | Kayser | G06T 7/75<br>382/103 |
| 2023/0224507 | A1* | 7/2023 | Nishi | H04N 19/61<br>382/240 |
| 2023/0232042 | A1* | 7/2023 | Hur | H04N 19/167<br>375/240.08 |
| 2023/0260197 | A1* | 8/2023 | Chou | H04N 19/176<br>345/424 |
| 2023/0316581 | A1* | 10/2023 | Lee | H04N 19/57<br>375/240.01 |
| 2023/0419557 | A1* | 12/2023 | Yoon | H04N 19/70 |
| 2024/0005564 | A1* | 1/2024 | Nishi | G06T 9/40 |
| 2024/0104828 | A1* | 3/2024 | Wang | G06T 15/20 |
| 2024/0144583 | A1* | 5/2024 | Chou | G06T 9/002 |
| 2024/0276013 | A1* | 8/2024 | Oh | H04N 19/119 |
| 2024/0338857 | A1* | 10/2024 | Park | H04N 19/176 |
| 2024/0354998 | A1* | 10/2024 | Takeda | H04N 21/816 |
| 2024/0386617 | A1* | 11/2024 | Yang | H04N 19/96 |
| 2025/0045970 | A1* | 2/2025 | Kwong | G06T 9/001 |
| 2025/0086842 | A1* | 3/2025 | Han | G06V 40/103 |
| 2025/0088665 | A1* | 3/2025 | Han | G06T 7/11 |
| 2025/0124601 | A1* | 4/2025 | Park | H04N 19/85 |

OTHER PUBLICATIONS

Mehta et al., "Modulated Periodic Activation for Generalizable Local Functional Representation", arXiv:2104.03960v1, Apr. 8, 2021, 10 pages.

Queiroz et al., "Compression of 3D Point Clouds Using a Region-Adaptive Hierarchical Transform", Institute of Electrical and Electronics Engineers Transactions on Image Processing, vol. 25, Issue 8. Aug. 2016, 10 pages.

Takikawa et al., "Neural Geometric Level of Detail: Real-Time Rendering with Implicit 3D Shapes", arXiv:2101.10994v1, Jan. 26, 2021, 10 pages.

* cited by examiner

Figure 6
RAHT-RGB
RAHT-YUV
Example Embodiment
0.129 bpp, 23.2 dB SNR
0.127 bpp, 24.3 dB SNR
0.127 bpp, 25.9 dB SNR
0.540 bpp, 26.5 dB SNR
0.536 bpp, 28.2 dB SNR
0.531 bpp, 30.0 dB SNR
1.005 bpp, 28.7 dB SNR
1.019 bpp, 31.3 dB SNR
1.003 bpp, 33.0 dB SNR

800

1000

LEARNED VOLUMETRIC ATTRIBUTE COMPRESSION USING COORDINATE-BASED NETWORKS

RELATED APPLICATION

The present application is a continuation of U.S. application Ser. No. 17/708,628 having a filing date of Mar. 30, 2022, which claims the benefit of and priority to U.S. Provisional Patent Application No. 63/309,699, filed Feb. 14, 2022. Applicant claims priority to and the benefit of each of such applications and incorporate each of such applications herein by reference in its entirety.

FIELD

The present disclosure relates generally to compression of attributes distributed over multidimensional domains. More particularly, the present disclosure relates to representing compressed attributes of volumetric or hypervolumetric domains using a coordinate-based network.

BACKGROUND

Applications involving dataset capture, processing, storage, and communication are increasingly leveraging multi-dimensional domains to index large quantities of attribute data. For example, three-dimensional point clouds play an important role in applications such as mapping and navigation, virtual and augmented reality, telepresence, cultural heritage preservation, etc. Given the volume of data in such applications—with attribute data associated with each point in the cloud of points—compression is useful for both storage and communication.

SUMMARY

Aspects and advantages of embodiments of the present disclosure will be set forth in part in the following description, or can be learned from the description, or can be learned through practice of the embodiments.

In one example aspect, the present disclosure provides for a first example system for machine-learned compression of multidimensionally-distributed attributes. The first example system includes one or more processors and one or more non-transitory, computer-readable media storing instructions that, when executed, cause the one or more processors to perform operations. In the first example system, the operations include obtaining a reference dataset including attributes indexed by a domain of multidimensional coordinates. In the first example system, the domain is subdivided into a plurality of blocks respectively associated with a plurality of attribute subsets. In the first example system, the operations include inputting, to a coordinate-based network of a decoder portion of an attribute compression pipeline, a latent representation associated with at least one block of the plurality of blocks. In the first example system, the latent representation is recovered from an encoder portion of the attribute compression pipeline. In the first example system, the operations include outputting, using the coordinate-based network and based on the latent representation, an attribute representation of one or more attributes of the attribute subset. In the first example system, the operations include updating the latent representation based on a comparison of the attribute representation and the reference dataset.

In one example aspect, the present disclosure provides for a second example system for representing compressed multidimensionally-distributed attributes. The second example system includes one or more processors and one or more non-transitory, computer-readable media storing instructions that, when executed, cause the one or more processors to perform operations. In the second example system, the operations include determining, for an input coordinate of a domain of multidimensional coordinates, at least one block of a plurality of blocks respectively corresponding to subdivisions of the domain. In the second example system, the operations include inputting, to a coordinate-based network of an attribute decoder, the input coordinate and a latent representation. In the second example system, the latent representation is obtained from a plurality of recovered component latent representations based on the at least one block. In the second example system, the plurality of recovered component latent representations are recovered using a domain-based transform. In the second example system, the operations include outputting, using the coordinate-based network, an attribute representation corresponding to the input coordinate.

In one example aspect, the present disclosure provides for an example method for representing compressed attributes of a point cloud. The example method includes receiving, by a computing system with one or more processors, a compressed encoding of attributes of a point cloud. In the example method, the compressed encoding includes a plurality of component latent representations corresponding to blocks respectively containing sets of voxels of the point cloud. The example method includes obtaining, by the computing system and for an input voxel, an accumulated latent representation based on the plurality of component latent representations. In the example method, the accumulated latent representation is obtained using one or more domain-based transforms. The example method includes inputting, by the computing system and to a coordinate-based network, the input voxel and the accumulated latent representation. The example method includes outputting, by the computing system and using the coordinate-based network, an attribute representation corresponding to the input voxel.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
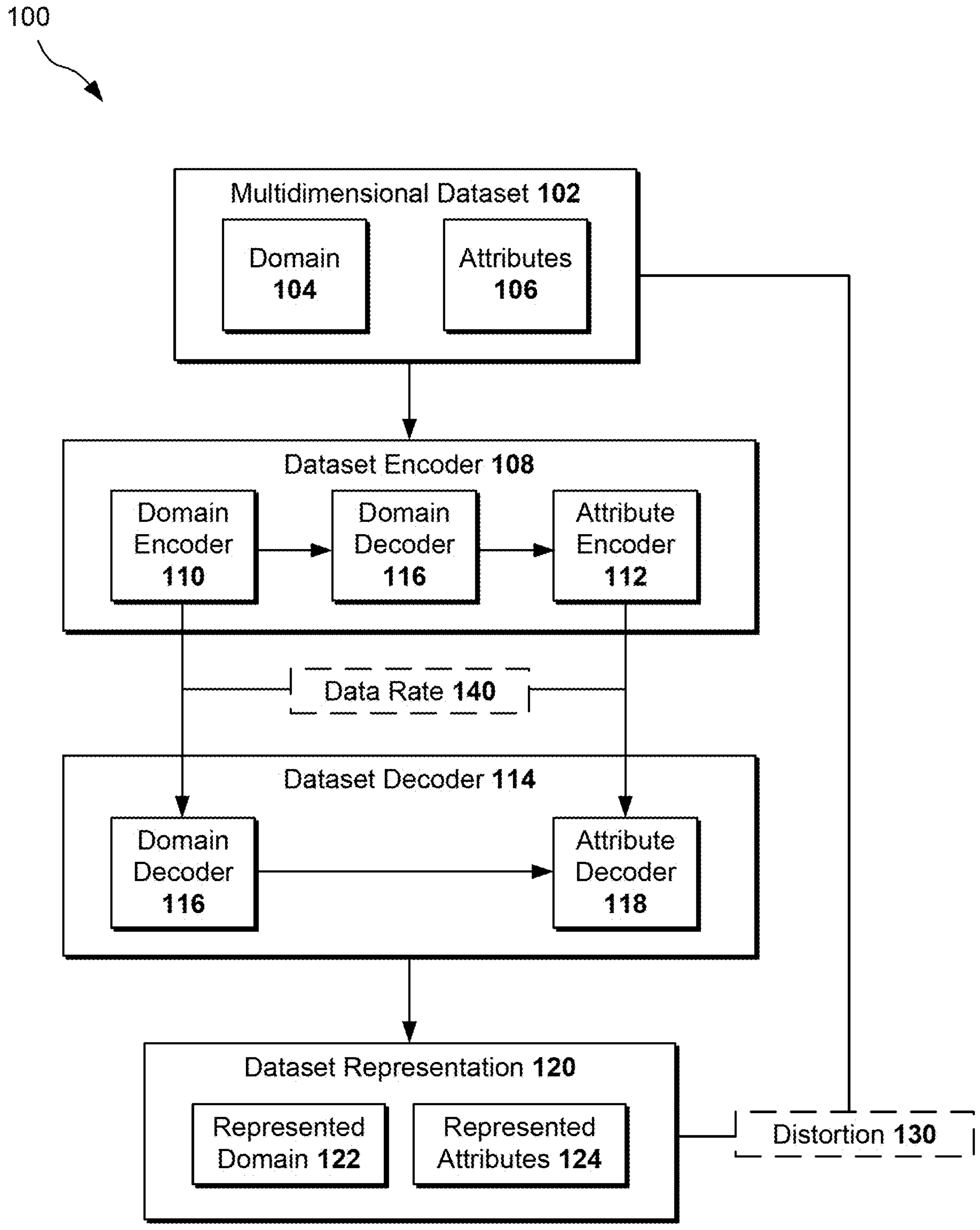
FIG. 1 depicts a block diagram of an example codec according to example embodiments of the present disclosure.

Reference numerals that are repeated across plural figures are intended to identify the same features in various implementations.

DETAILED DESCRIPTION

Overview

Generally, the present disclosure is directed to learned compression of attributes of multidimensional domains (e.g., volumetric or hypervolumetric domains). For example, some embodiments of the present disclosure relate to compression of attribute data for point clouds. Point clouds can, in some instances, be understood as a collection of points occupying positions in a three-dimensional space that are each associated with various attributes (e.g., color, signed distance, reflectance, normals, transparency, density, spherical harmonics, etc.). The three dimensions of the space provide a domain of coordinates that can index the attribute data. Storing and communicating point clouds, especially at high resolutions, can be data-intensive. Although various examples in the present disclosure are discussed in terms of point clouds and volumetric datasets, it is to be understood that the techniques described herein are not limited to point clouds or volumetric datasets and are equally applicable to other dimensionalities (e.g., higher dimensions, lower dimensions, etc.) to obtain advantages in reduced-data representations of attributes of datasets.

Advantageously, systems and methods according to the present disclosure can provide for improved compression of attribute data associated with point clouds or other volumetric or hypervolumetric datasets. In some embodiments, a local nonlinear operator can be constructed to output the attributes associated with an input coordinate of interest. For example, a local nonlinear operator can include a mapping from an input coordinate, optionally accompanied by a context vector, to an output containing a set of attributes associated with the input coordinate. In some embodiments, the operator can be local (e.g., the domain of the input coordinate(s) can be bounded). In some embodiments, the operator can be nonlinear (e.g., as a function of the context vector(s) given a fixed coordinate).

For instance, in some embodiments, a local nonlinear operator can include a machine-learned coordinate-based network. For instance, a coordinate-based network can be trained to output the attributes associated with an input coordinate of interest. For example, the domain of the attribute data can be subdivided into subdomains or blocks, and a coordinate-based network can be localized to each block for outputting the attributes of coordinates within that block. In some examples, the coordinate-based network can be localized using a context vector input into the coordinate-based network. In this manner, for instance, a coordinate-based network having a set of global parameters shared across the dataset can also receive a local context vector associated with the block containing the coordinate(s) of interest. The context vector can locally resolve the output of the coordinate-based network within that block (e.g., effectively forming a local coordinate-based network). In some examples, the context vector can be a machine-learned latent representation of the attribute data within the block. In this manner, for instance, the attribute data can be compressed by encoding the latent representation(s) associated with the attribute data (e.g., optionally without directly encoding every entry of the attribute data into a compressed format). In this manner, for instance, the attribute data can be represented (e.g., in storage, as transmitted, etc.) by leveraging the latent representation(s) (e.g., optionally without directly storing/transmitting every entry of the attribute data in a compressed format).

In some embodiments, compressing a reference dataset can include training an attribute compression pipeline to obtain the machine-learned latent representations for representing reference attributes. For example, a compression pipeline can include an encoder portion configured to encode the latent representation(s) for compression and a decoder portion configured to represent the attributes of the reference dataset from the learned latent representation(s) using a coordinate-based network. A loss can be determined based on a comparison of the output representation of the attributes and the reference attributes (e.g., a distortion metric). In some examples, the loss can also be based on a data cost of a compressed encoding of the latent representation(s) (e.g., a bitrate metric). In some embodiments, the loss can be used to update one or more learnable parameters of the compression pipeline (e.g., parameters of the coordinate-based network, the latent representation(s), or other parameters of the compression pipeline).

In some embodiments, once learned, the latent representations can be encoded and stored, transmitted, or otherwise used to more compactly represent the reference attributes. In some embodiments, an encoder can output only the encoded latent representations. For instance, in some examples, the shared parameters of the coordinate-based network are generalized across multiple reference datasets, and the shared parameters need not be transmitted by the encoder if already available to the decoder. In some embodiments, an encoder can output the encoded latent representations along with the shared parameters of the coordinate-based network (e.g., if the corresponding decoder did not have the shared parameters, if the shared parameters are not generalized across the reference dataset(s) of interest, etc.).

Advantageously, systems and methods according to example aspects of the present disclosure can provide for improved compression of multidimensional datasets. Improved compression can provide for representing a dataset more efficiently: e.g., representing the dataset with fewer bits or representing the dataset with higher fidelity given a target number of bits. In some examples, improved compression can provide for decreased storage requirements for multidimensional data (e.g., point clouds, etc.) as well as decreased network bandwidth requirements for transmitting the datasets over a network. In this manner, for instance, computing systems can receive, transmit, process, render, or store multidimensional data (e.g., point clouds) using less processing power, memory, storage, etc. Accordingly, for example, computing systems can increase a capability to perform operations using references to attributes of multidimensional datasets (e.g., capturing, storing, editing, or rendering point clouds, etc.).

Furthermore, systems and methods according to example aspects of the present disclosure can provide for more efficient representations of attributes of multidimensional datasets for improved performance in resource-constrained implementations. For instance, battery-powered computing devices or devices with other resource constraints (processing constraints, thermal constraints, etc.) can be tasked with transmitting (e.g., wirelessly) or processing large volumes of multidimensional data, such as, for example, to render virtual/augmented reality imagery, to capture/process/store point clouds from onboard radar/lidar sensors, etc. Example embodiments according to aspects of the present disclosure can provide for more efficient transmission of multidimensional data by leveraging compression techniques as described herein, providing for improvements to the capabilities of such computing devices to perform tasks within resource constraints.

With reference now to the Figures, example embodiments of the present disclosure will be discussed in further detail.

Example Model Arrangements

FIG. 1 depicts a block diagram of an example codec pipeline 100 according to example embodiments of the present disclosure. A multidimensional dataset 102 can include a domain 104 and attributes 106, with attributes 106 indexed over the domain 104. A dataset encoder 108 can include a domain encoder 110 to encode the domain 104 and an attribute encoder 112 to encode the attributes 106 for decoding by a downstream dataset decoder 114. In some embodiments, the encoding of the attributes 106 can be conditioned at least in part on the domain 104. To aid in decoding of domain-conditioned attribute encodings, the dataset encoder 108 can optionally contain a domain decoder 116 (e.g., optionally the same as in the dataset decoder 114) so that the attribute encoder 112 can condition the encoding(s) on the same decoded domain that will be available to the downstream attribute decoder 118 from the downstream domain decoder 116.

In some embodiments, a dataset decoder 114 can include a domain decoder 116 and an attribute decoder 118. The dataset decoder 114 can be configured to receive encodings of the domain 104 and the associated attributes 106 and output a dataset representation 120 that contains a represented domain 122 and represented attributes 124 associated with the represented domain 122. A quality of the dataset representation 120 can be evaluated, in some embodiments, by a distortion metric 130 measured between the dataset representation 120 and the reference, the multidimensional dataset 102. Reduction of data can be evaluated, in some embodiments, by a data rate metric 140 measured at the output of the dataset encoder 108 or the input of the dataset decoder 114. In this manner, the codec pipeline 100 provides for compression of the multidimensional dataset 102 for representation by the dataset representation 120 in a manner that can be measured for distortion performance or data reduction performance.

In some embodiments according to example aspects of the present disclosure, a multidimensional dataset 102 can include datasets with a plurality of dimensions, such as two, three, four, or more dimensions. For example, in some embodiments, the domain 104 can include two, three, four, or more dimensions. For instance, the domain 104 can correspond to a spatial domain, such as a planar or volumetric domain parametrized using a coordinate system (e.g., Cartesian coordinates, polar coordinates, cylindrical or spherical coordinates, homogeneous coordinates, Plücker coordinates, or any other coordinate system). In some embodiments, the domain can be encoded and/or projected into a different space, such as a higher-dimensional space (e.g., with sinusoidal input encoding, etc.). In some embodiments, the domain 104 can include a temporal dimension. The attributes 106 can also include one or more dimensions. In some embodiments, the attributes 106 can include, for instance, values of one or more color channels associated with a particular coordinate in the domain 104 (e.g., red, green, blue, hue, saturation, value, alpha, etc.). In some embodiments, the attributes 106 can include other attributes (e.g., signed distance, reflectance, normals, transparency, density, spherical harmonics, etc.). In some embodiments, attributes 106 can include regional attributes that capture information about a region of domain 104 (e.g., semantic information about the region, such as a label or tag associated with an object depicted within the region, etc.). In some embodiments, attributes 106 can include data about more refined characteristics of the domain 104, such as information about geometry of the domain at a higher resolution than the domain 104 itself. For example, in some embodiments, the domain can include points of a point cloud descriptive of a shape in space, and one or more attributes associated with the points can include geometry finer than the point level (e.g., inter-point geometry, surfaces, etc.).

In some embodiments according to example aspects of the present disclosure, a distortion metric 130 can be substantially any measurement corresponding to a quality of the dataset representation 120, optionally with reference to a difference between the dataset representation 120 and the reference multidimensional dataset 102. For instance, a distance metric may be used. In some examples, the distance between the attributes 106 and the represented attributes 124 may be used to measure the quality of the dataset representation 120. In some examples, the distance between renderings or projections onto one or more two-dimensional viewpoints of the multidimensional dataset 102 and the dataset representation 120 may be used to measure the quality of the dataset representation 120. In some examples, a perceptual quality metric may be used (e.g., corresponding to a measure or expectation of a human or machine's perceived quality of the dataset representation, either with or without explicit reference to the reference multidimensional dataset 102).

In some embodiments according to example aspects of the present disclosure, a data rate 130 can be substantially any measurement corresponding to an amount of data associated with storage, communication, or other expression of the encodings. For instance, the data rate metric 130 can be or otherwise include a bitrate measurement, such as a measurement of bits per unit of the multidimensional dataset 102 (e.g., bits per point, etc.).

Figure 2:
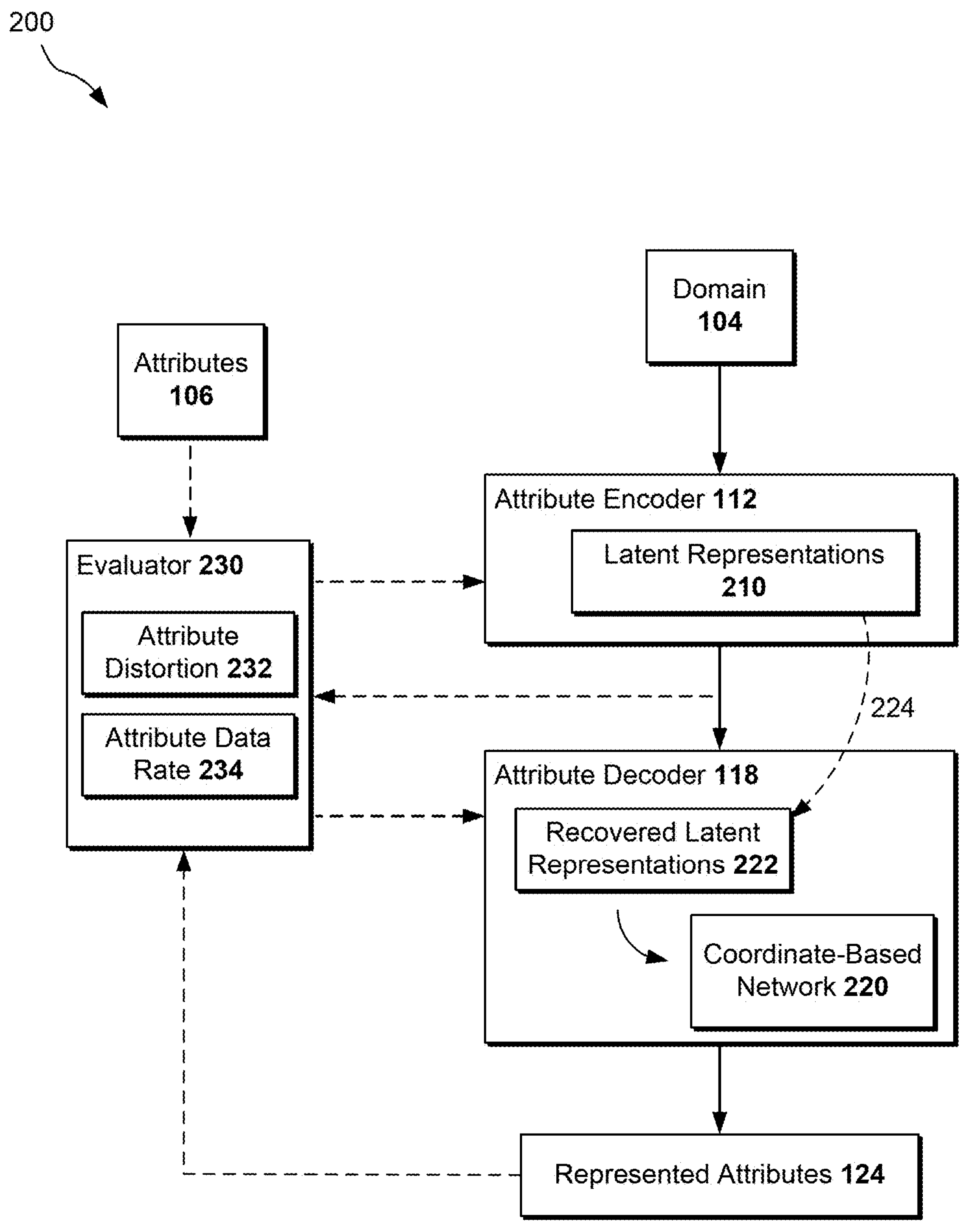
FIG. 2 depicts a block diagram of an example compression pipeline according to example embodiments of the present disclosure.

FIG. 2 depicts a block diagram of an example attribute compression pipeline 200 according to example aspects of embodiments of the present disclosure. The attribute encoder 112 can receive data descriptive of the domain, such as domain 104 from the reference multidimensional dataset 102 (pictured) or represented domain 122 from the domain decoder 116. In this manner, for example, encodings of the attributes 106 can be conditioned on the domain (e.g., for prioritizing expenditure of a bitrate budget for optimizing quality).

In some embodiments according to example aspects of the present disclosure, the attribute encoder 112 can implicitly learn latent representations 210 for input to a coordinate-based network 220 of the attribute decoder 118 (e.g., as recovered latent representations 222, after decoding) to generate represented attributes 124 for one or more coordinate(s) of interest in the domain 104. The coordinate-based network can be substantially any type of machine-learning model, such as a neural network of substantially any architecture (e.g., a multilayer perceptron). The latent representations 210 (e.g., and thus, the recovered latent representations 222) can be machine-learned by training with evaluator 230. For example, in some embodiments, training may assume lossless encoding of the latent representations 210 and bypass the initial decoding of the encoded latents with bypass 224 and proceed to further processing the latents for input to the coordinate-based network 220. In some embodiments, evaluator 230 can compare represented attributes 124 and the reference attributes 106 to determine attribute distortion 232. In some embodiments, evaluator 230 can measure a data rate or quantity associated with communication of encoded latent representations from the attribute encoder 112 to the attribute decoder 118 to determine attribute data rate 234.

A coordinate-based network 220 of the attribute decoder 118 can, in some embodiments, approximate a function that receives, as an input, a coordinate of interest, and returns, as an output, attribute(s) associated with the coordinate. For example, in some embodiments, the domain 104 can be or otherwise include three or higher dimensional space of dimensionality d, and the attributes 106 can be or otherwise include a space of dimensionality r. A real-valued (or real vector-valued) function $$f: \mathbb{R}^d \rightarrow \mathbb{R}^r \tag{1}$$

can be characterized as volumetric (e.g., d=3) or hypervolumetric (e.g., d>3). In some examples, such a function $f$ can be fit by another function $f_\theta$ from a parametric family of functions $\{f_\theta: \theta \in \Theta\}$ by optimizing (e.g., decreasing, minimizing, etc.) an error $d(f, f_\theta)$ over $\theta \in \Theta$. For instance, an example reference dataset can be a point cloud $$\{(x_i, y_i)\}_{i=1}^k$$

having k points $x_i \in \mathbb{R}^3$ with corresponding attribute(s) $y_i \in \mathbb{R}^r$. Parameters θ of coordinate-based network 220 can approximate or otherwise effectively implement a function $\hat{y}_i = f_\theta(x_i; \hat{Z})$ to output a representation $\hat{y}_i$ of the reference attribute vector $y_i$ for a given $x_i$ in view of recovered latent representations $\hat{Z}$. (Additionally, $f_\theta$ can be used to interpolate or extrapolate attributes at an arbitrary position $x \in \mathbb{R}^3$.) The recovered latent representations $\hat{Z}$, in some embodiments, can be learned by the attribute encoder 112 as an input to the compression pipeline 200, latent representations Z, which can be subsequently compressed and encoded (at least partially) for transmission to the attribute decoder 118 for recovery as $\hat{Z}$. In some embodiments, θ can be compressed and transmitted as $\hat{\theta}$ according to any suitable model compression technique.

With reference to the above notation, evaluator 230 can, in some embodiments, evaluate an attribute data rate 234 including $R(\hat{Z})$ bits (e.g., the bits for entropy coding or otherwise encoding the values of $\hat{Z}$, or transforms thereof). In some embodiments, parameters θ may generalize across domains (e.g., across different point clouds) and need not be transmitted with each $\hat{Z}$. However, in some examples, evaluator 230 can evaluate an attribute data rate 234 including $R(\hat{\theta}, \hat{Z})$ bits (e.g., the bits for entropy coding or otherwise encoding the values of $\hat{\theta}$ and $\hat{Z}$, or transforms thereof). The evaluator 230 can also evaluate an attribute distortion 232 based on a difference between $\hat{y}_i$ and $y_i$, or, as in one example, $$D(\hat{\theta}, \hat{Z}) = \sum_{i=1}^{k} \|y_i - \hat{y}_i\|^2. \tag{2}$$

In some examples, a rate-distortion metric can be expressed as a Lagrangian, $$J(\hat{\theta}, \hat{Z}) = D(\hat{\theta}, \hat{Z}) + \lambda R(\hat{\theta}, \hat{Z}) \tag{3}$$

for some Lagrange multiplier $\lambda > 0$ matched to $R_0$.

In this manner, for example, a set of recovered latent representations 222 can be learned (e.g., by updating the latent representations 210) in joint training with parameters of the coordinate-based network 220 to optimize represented attributes 124. For example, during training, the represented attributes 124 output by the coordinate-based network 220 can be evaluated by evaluator 230, and based on the evaluation, an update can be applied to one or more parameters of the attribute encoder 112 (e.g., the latent representations 210, other encoding parameters, such as quantization step size parameters or other parameters) or one or more parameters of the attribute decoder 118 (e.g., the parameters of the coordinate-based network, etc.). For example, in some embodiments, the compression pipeline 200 can be trained in an end-to-end fashion. For instance, in some embodiments, a loss (e.g., based on at least one of the attribute distortion 232, or the attribute data rate 234, or both) can be backpropagated through the compression pipeline 200 for updating one or more learnable parameters as described herein.

Data descriptive of the domain 104, such as domain 104 from the reference multidimensional dataset 102 (e.g., as drawn) or represented domain 122 from the domain decoder 116, can be used in some embodiments to condition encodings of the attributes 106 on the domain 104. In some embodiments, conditioning on the domain can include allocating greater bitrate (e.g., a greater portion of an absolute or relative data budget) for regions of the domain having a greater influence on the quality of the output. For instance, conditioning on the domain can include allocating more data budget for regions of the domain having greater semantic importance (e.g., being more likely to communicate or otherwise represent recognizable features of the reference dataset 102, such as a face of a person's likeness captured by a point cloud). In some examples, conditioning on the domain can include allocating more data budget for more dense or detailed regions of the domain, with less budget allocated for more sparse regions of the domain. For instance, in some embodiments, the domain can be subdivided into groups or blocks, and the compression pipeline 200 can use more data budget to encode the blocks containing more of the domain (e.g., more points, etc.) than blocks containing less of the domain (e.g., fewer points, etc.).

Figure 3:
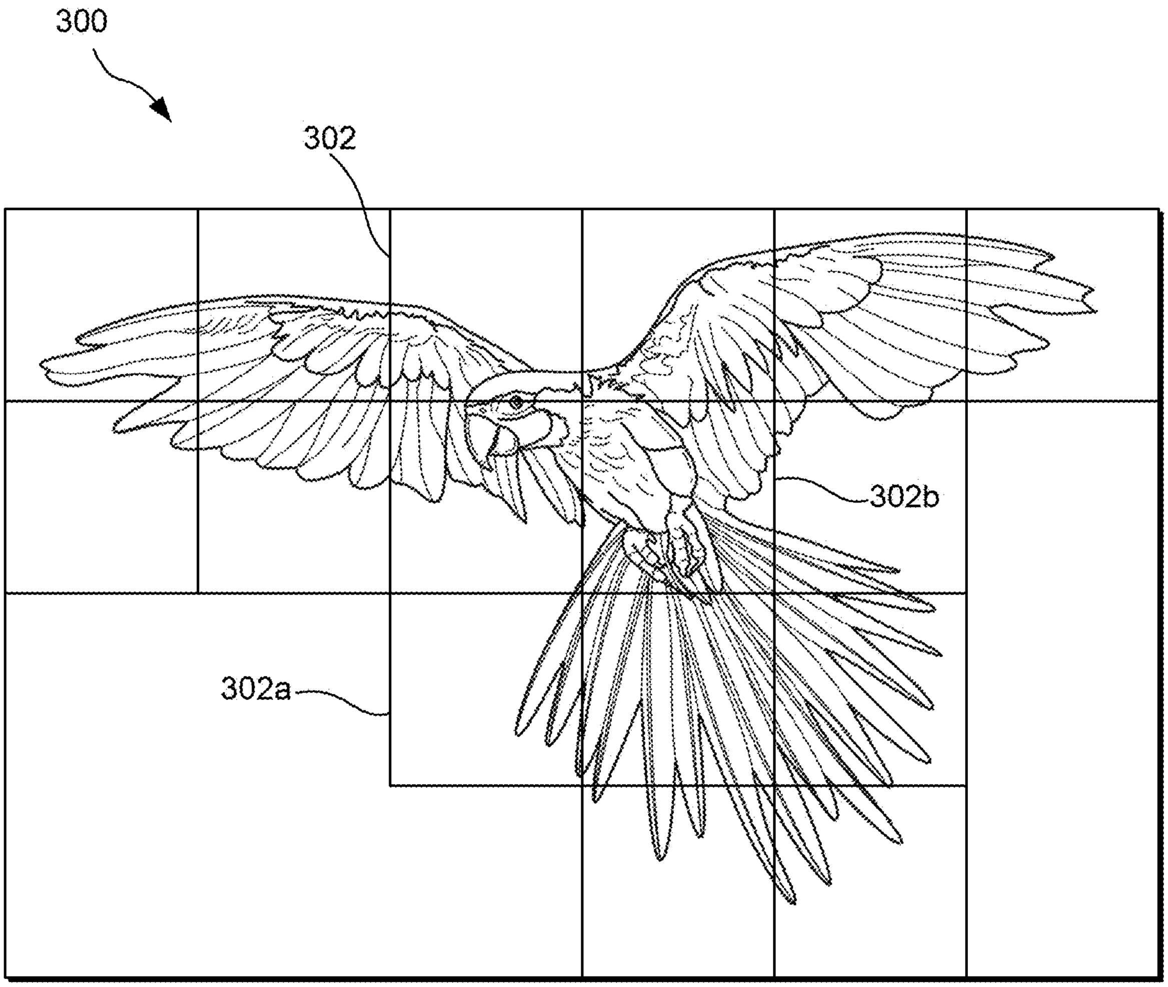
FIG. 3 depicts an illustration of subdividing an example reference dataset according to example embodiments of the present disclosure.

Example techniques for subdivision of the domain are illustrated as follows with reference to FIG. 3. FIG. 3 depicts an illustration of a reference dataset 300 (e.g., a model of a flying bird) subdivided into a number of blocks 302 occupied by the domain of the dataset. The domain may not be distributed evenly across the blocks, as block 302*a* can be seen to contain less detailed information than block 302*b*. However, it is contemplated that blocks can be drawn to effectively balance (e.g., equalize) the quantity of information associated with each block.

In some embodiments, each block can be associated with a latent representation, such that attributes of a coordinate of interest within the block can be represented by a coordinate-based network based on the coordinate of interest and the corresponding latent representation. For example, for a block $\mathcal{B}_n$ at offset b (e.g., a distance from an origin), a representation $\hat{y}_i$ of attributes of coordinate $x_i$ within $\mathcal{B}_n$ can be predicted by a coordinate-based network as $\hat{y}_i=f_\theta(x_i-b; \hat{z}_n)$, where $\hat{z}_n$ is the recovered latent representation 222 associated with $\mathcal{B}_n$. In this manner, for instance, the attributes $y_i$ can be fit with a coordinate-based network shifted to the offset and localized by a local context vector, the latent representation for $\mathcal{B}_n$. In some embodiments, the coordinate-based network parameters θ are learned and fixed for each reference dataset, or for a particular class of reference datasets (e.g., point clouds in general). In this manner, for instance, one role of θ in some embodiments can be expressed as selecting a family of volumetric (or hypervolumetric) functions for representing the reference dataset, or for a particular class of reference datasets, while one role of $\hat{z}_n$ (or $z_n$) can be expressed as choosing a member of the family for a respective block.

In some embodiments, latent representations for blocks with finer details, denser features, or otherwise characterized by more information can be communicated with greater bit depth as compared to latent representations for blocks with less detail or sparse features. For example, as block 302*a* can be seen to contain less detailed information than block 302*b*, in some embodiments, the latent representation for block 302*a* may be communicated with less bit depth than the latent representation for block 302*b*.

Figure 4:
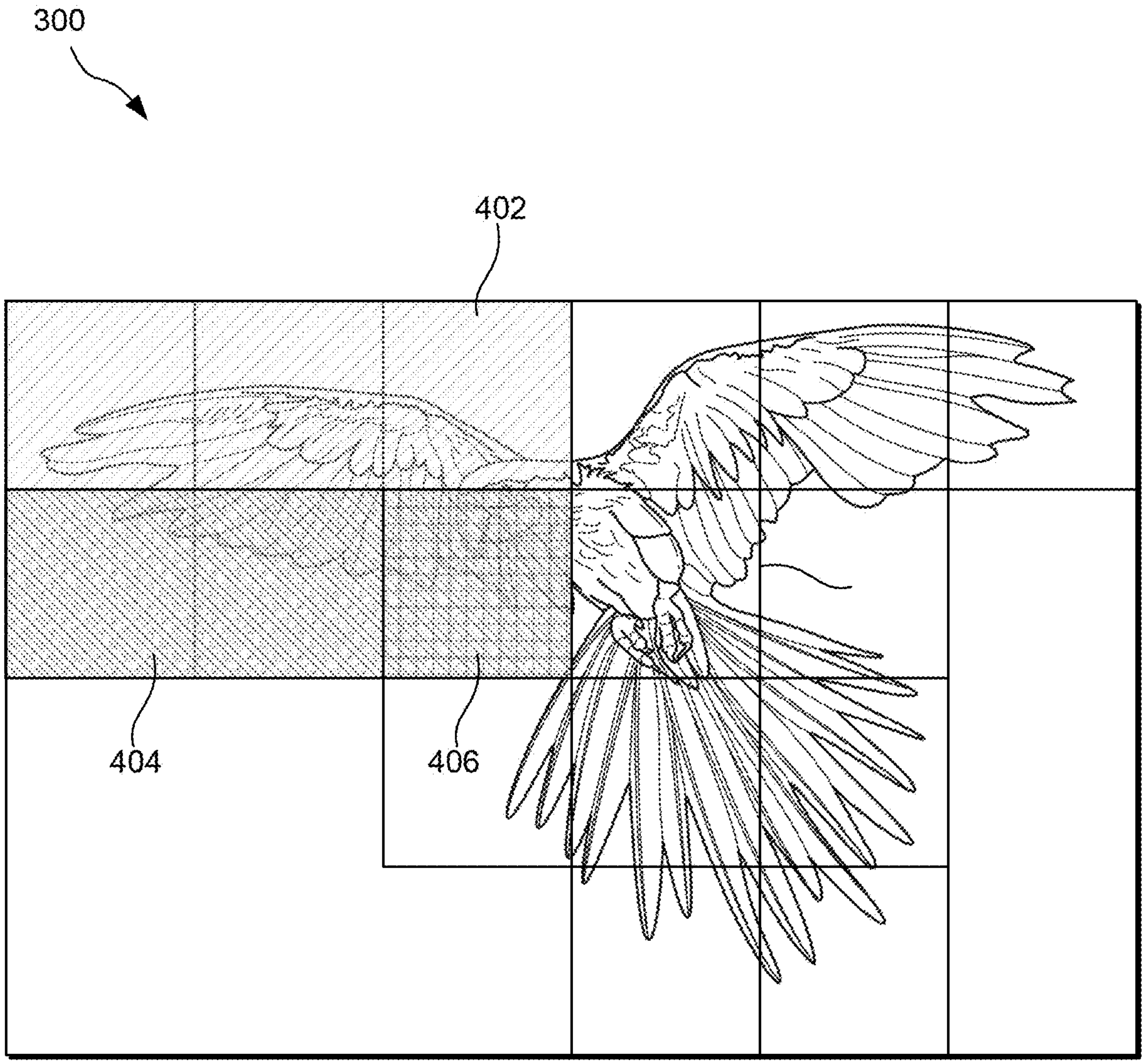
FIG. 4 depicts another illustration of subdividing an example reference dataset according to example embodiments of the present disclosure.

In some embodiments, a block can be associated with multiple latent representations. For example, a block can be associated with a latent representation obtained from multiple components (e.g., component latent representations). For example, FIG. 4 depicts the reference dataset 300. In some embodiments, blocks can be arranged in layers. For example, a first block 402 (drawn shaded with positive-slope parallel lines) can be arranged on a first layer. A second block 404 (drawn shaded with negative-slope parallel lines) can be arranged on a second, overlapping layer. A third block 406 (drawn shaded with a grid of vertical and horizontal lines) can be arranged on a third, overlapping layer. In some embodiments, a block covering the entire domain (e.g., covering all of reference dataset 300) can be considered an underlying layer (e.g., a zeroth layer).

In some embodiments, the blocks on each layer can be associated with a component of a latent representation (e.g., a component latent representation). For example, the first block 402 can be associated with a first component, the second block 404 can be associated with a second component, and the third block 406 can be associated with a third component. In some embodiments, the components are learned as difference vectors (e.g., defined with respect to each other, such as with respect to blocks of a preceding/succeeding layer, etc.). In some embodiments, the components are learned as a matrix of difference vectors. In some embodiments, the components are implicitly learned as difference vectors by training based on the results of using accumulations of the components as a latent representation for input to the coordinate-based network.

In some embodiments, blocks are generated on layers by determining a hierarchical space partition represented by a binary tree. For instance, a root of the tree (e.g., layer zero) can correspond to a block containing the entire dataset (e.g., the entire point cloud). The leaves of the tree (e.g., layer L) can correspond to the N blocks within which the coordinate-based network locally resolves the attributes from respective latent representations (e.g., the blocks shown in FIG. 3). In between, the blocks can be recursively split, for example, into child blocks. For example, in some embodiments, the blocks can be split into child blocks of equal size. For instance, in one example, occupied blocks can be split into left and right child blocks of equal size along either an x-, y-, or z-axis in an alternating fashion (e.g., in turn based on the result of layer modulo 3). In some embodiments, child blocks that are occupied are retained in the tree.

In some embodiments, a plurality of component latent representations can be coded for transmission or storage more efficiently than a set of full latent representations for the leaf blocks. For instance, the components can, in some embodiments, contain smaller values (e.g., near zero) that can be coded (e.g., entropy coded) with fewer bits. In some embodiments, a set of learned component latent representations can be further transformed for efficient coding by conditioning on the domain 104.

Conditioning on the domain 104 can, in some embodiments, leverage the block structure used to subdivide the domain 104. For example, in some embodiments, a latent representation associated with a leaf block (e.g., block 406) can be constructed based on the components associated with the blocks it overlaps. For example, a latent representation for mapping the attributes of points within block 406 with a coordinate-based network can be obtained based on the components associated with underlying blocks 402 and 404.

Figure 5:
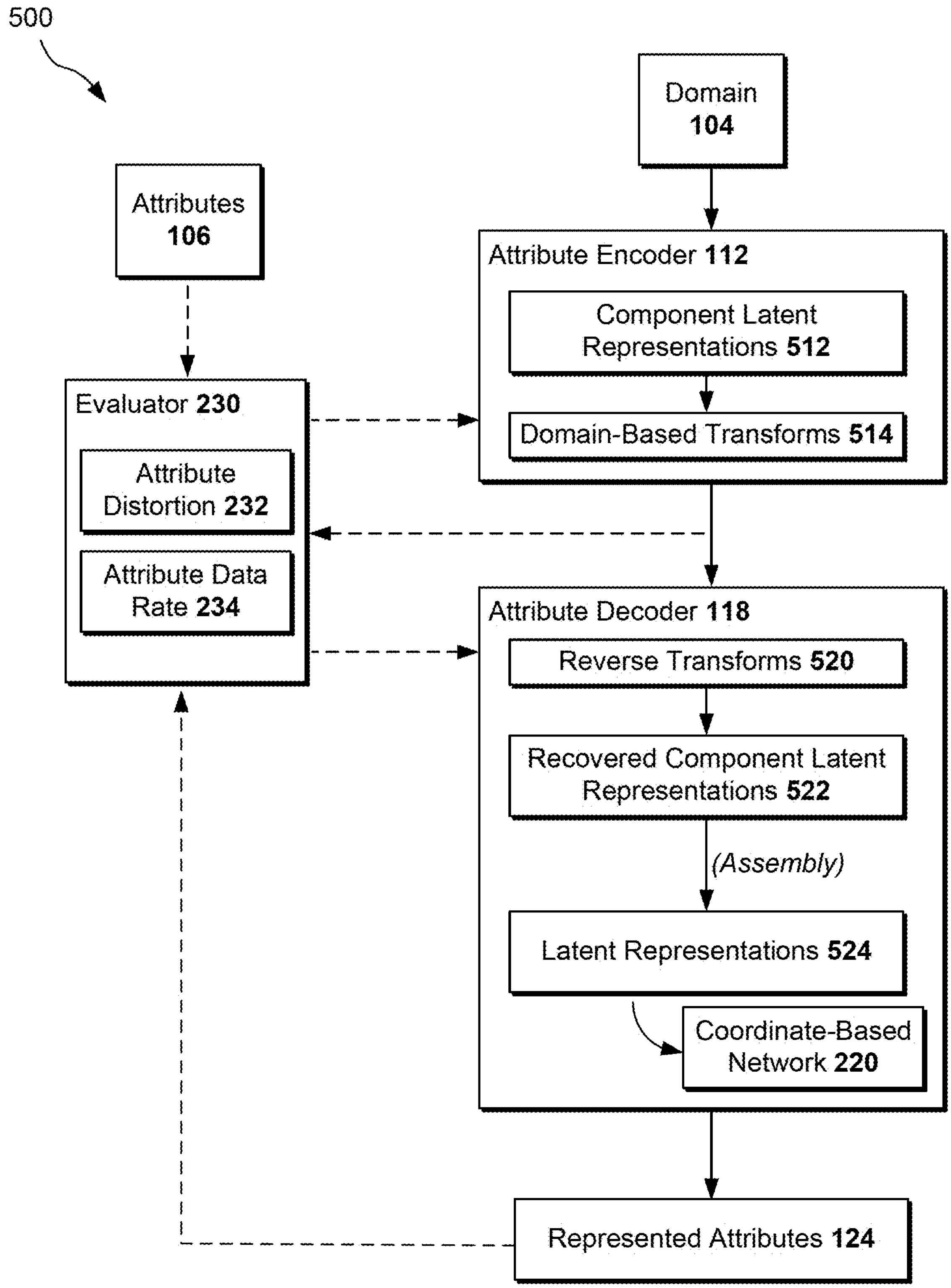
FIG. 5 depicts another block diagram of an example compression pipeline according to example embodiments of the present disclosure.

Domain-based transforms can, in some embodiments, be used to condition encoding of the latent representations based on the domain 104. For example, FIG. 5 depicts a block diagram of an example compression pipeline 500 in which attribute encoder 112 implicitly learns component latent representations 512. Optionally, and as drawn, domain-based transforms 514 can be applied to the component latent representations 512 based on the domain 104. The domain-based transforms can be reversed at 520 after receipt at the attribute decoder 118 to obtain recovered component latent representations 522. The recovered component latent representations 522 can be assembled (e.g., as discussed with respect to FIG. 4) to form latent representations 524.

In some embodiments, for example, the domain-based transforms 514 can influence a data-reduction technique used to reduce a number of bits used to communicate the component latent representations 512. For instance, in some embodiments, quantization can be employed to reduce the number of bits used to communicate the component latent representations 512, although it is to be understood that other techniques can also be used to reduce the number of bits used to communicate the component latent representations 512. For instance, in some embodiments, domain-based transforms 514 can be used to preprocess the component latent representations 512 such that a subsequent quantization operation truncates or otherwise limits the bit depth of component latent representations 512 in a manner conditioned on the domain 104.

For instance, in some embodiments, domain-based transforms 514 can include scaled step size parameters for application to the respective component latent representations of the blocks. For instance, a scaled step size parameter, in conjunction with a quantization operator (e.g., rounding, such as rounding to an integer) can provide for a quantized value having a greater bit depth than a differently scaled value.

The scaled step size parameters can include, for instance, a scaling component based on characteristics of the block corresponding to the component latent representation being scaled. For instance, a scaling component can scale values of a component latent representation based on a relative importance of a block of the domain 104 corresponding to the component latent representation being scaled. For instance, a scaling component can scale values of a component latent representation based on a quantity of points in a block of the domain 104 corresponding to the component latent representation being scaled. In some embodiments, a constant scaling component can be applied across the values of a respective component latent representation, while different scaling components can be applied across different component latent representations.

The scaled step size parameters can include, for instance, a step size component learned for adjusting the bit depth per channel of the component latent representations. For instance, the step size component can be applied consistently across different component latent representations while varying across the channels of each component latent representation. In some embodiments, the step size component is learned jointly with the latent representations or the parameters of the coordinate-based network. In some embodiments, the scaled step size parameters for respective component latent representations are the respective products of the scaling components and the step size components.

For example, component latent representations 512 can, in some embodiments, be expressed as a matrix V, optionally configured such that the rows of V respectively correspond to the component latent representations of the blocks. A diagonal scaling matrix S can be obtained with scaling components arranged on the diagonal (e.g., scaling parameters for the respective component latent representations on the rows of V). In one example, S can be expressed as $$S = \mathrm{diag}(s_1, \ldots, s_N) \text{ where}$$

$$s_1 = (\text{count of domain})^{-1/2} \tag{4}$$

$$s_m = \left(\frac{w_{l+1,n_L}\left(w_{l+1,n_L} + w_{l+1,n_R}\right)}{w_{l+1,n_R}}\right)^{-1/2} \tag{5}$$

and where l+1 is the layer on which the m-th occupied block resides (e.g., the m-th block being associated with the m-th component latent representation, the m-th row of V), and $w_{l+1,n_L}$ and $w_{l+1,n_R}$ are, respectively, the weights of (e.g., number of points in) the left and right child blocks of their respective parent block (e.g., in the hierarchical tree). A diagonal step size matrix $\Delta=\mathrm{diag}(\Delta_1, \ldots, \Delta_C)$ can be obtained for channels c=1, . . . , C, where the entries in Δ correspond to step size components for affecting a bit depth of a per-channel basis. Combined, the domain-based transforms S and Δ can be applied to V as $U=S^{-1}V\Delta^{-1}$, where U is a scaled set of component latent representations configured to provide for domain-aware data budget allocation in subsequent compression processes, even if evenly applied across U. For example, an example quantizer can round U elementwise to produce an integer matrix $\hat{U}=\lfloor U \rceil$. In this manner, for instance, although the elements of U are all rounded elementwise to the same position (e.g., to be integers), the domain-based transforms 514 can provide for greater bit depth conditioned on the geometry of the domain.

The domain-based transforms 514 can be reversed by reverse transforms 520. For example, in some embodiments, with reference to the above notation, S and Δ can be used at the decoder 118 to recover V from U (e.g., as V=SUΔ) or to recover a compressed (e.g., quantized) $\hat{V}$ from $\hat{U}$ (e.g., as $\hat{V}=S\hat{U}\Delta$). In this manner, for example, recovered component latent representations 522 can be recovered at the decoder 118 for obtaining latent representations 524 for input to the coordinate-based network 220.

In some embodiments, learning component latent representations 512 can provide for more compact and data-efficient communication of the attributes 106 (e.g., representations thereof) from the encoder 112 to the decoder 118. For instance, in some embodiments, assembling a plurality of component latent representations 512 including incremental differences from layer to layer, block to block, can permit more efficient encoding of the smaller, incremental values.

An example scheme for describing latent representation difference vectors provides a top-down approach based on split blocks containing child blocks being assigned a value based on the domain-weighted value of the child blocks. For instance, a block at layer l underlying leaf blocks at layer l+1 (e.g., blocks associated with the full, accumulated latent representation for input to the coordinate-based network for output of the attributes for coordinates within the blocks) can be assigned the domain-weighted value $$z_{l,n} = \left(\frac{w_{l+1,n_L}}{w_{l+1,n_L} + w_{l+1,n_R}}\right) z_{l+1,n_L} + \left(\frac{w_{l+1,n_R}}{w_{l+1,n_L} + w_{l+1,n_R}}\right) z_{l+1,n_R} \tag{6}$$

which provides for difference vectors $$\delta z_{l+1,n_L} = z_{l+1,n_L} - z_{l,n} \tag{7}$$

$$\delta z_{l+1,n_R} = z_{l+1,n_R} - z_{l,n} \tag{8}$$

that can be, in some embodiments, close to zero and efficient to encode. At the other end, the zeroth block (e.g., $z_{0,0}$, covering the domain 104) can include an average of the latent representations across the entire domain Substituting equations (7) and (8) into (6) provides the constraint $$0=\left(\frac{w_{l+1,n_L}}{w_{l+1,n_L}+w_{l+1,n_R}}\right)\delta z_{l+1,n_L}+\left(\frac{w_{l+1,n_R}}{w_{l+1,n_L}+w_{l+1,n_R}}\right)\delta z_{l+1,n_R} \quad (9)$$

which can provide for recovery of $\delta z_{l+1,n_L}$ given $\delta z_{l+1,n_R}$, and vice versa. In this manner, for example, by learning a set of difference vectors as component latent representations, such as V learned by the encoder 112, V can include in its rows just, for example, the right-child difference vectors (e.g., $\delta z_{l+1,n_R}$), since the decoder 118 can recover the left-child differences $\delta z_{l+1,n_L}$ using the constraint in (9).

Accordingly, in some embodiments, assembling the latent representations 524 from recovered component latent representations 522 can include performing a synthesis transform to accumulate the difference vectors following the hierarchical tree from root (zeroth layer) to leaf (e.g., the top-layer block within which the coordinate-based network locally predicts the attributes of a coordinate of interest). For instance, in some embodiments, starting with the root (e.g., $z_{0,0}$), the partial child differences recovered in V (e.g., or $\hat{V}$) and completed with (9) can be inserted into (7) and (8) to obtain the accumulated value of the subsequent layer. This can be repeated until the leaf blocks are reached. In some embodiments, a linear transform $T_s$ can accumulate the difference vectors following the hierarchical tree from root (zeroth layer) to leaf to obtain latent representations 524 Z from V as $Z=T_sV$ (or, e.g., $\hat{Z}$ from $\hat{V}$ as $\hat{Z}=T_s\hat{V}$), where each row of $T_s$ computes a latent representation (e.g., stored in a row of Z).

In some embodiments according to example aspects of the present disclosure, a compression coding component for encoding the latent representations (e.g., component latent representations, representations thereof, etc., such as, e.g., V, U, or $\hat{U}$) can include one or more learnable parameters for joint training while the latent representations are learned (e.g., as in FIGS. 2 and 5. For example, in some embodiments, latent representations (e.g., component latent representations, representations thereof, etc., such as, e.g., V, U, or $\hat{U}$) can be entropy coded according to one or more learnable parameters. These parameters can be used by the decoder to decode the latent representations. In some embodiments, for example, the Continuous Batched Entropy (cbe) model with the Noisy Deep Factorized prior from the Tensorflow™ toolkit can be used. In some embodiments, a backward-adaptive entropy code can be used. For instance, a backward-adaptive entropy code can be used optionally without additional overhead for transmitting learned model parameters for the entropy code. For example, in some embodiments, a Run-Length Golomb-Rice code can be used.

In some embodiments, different quantizers or entropy coders can be used during training and at inference. For instance, it may be desired to train with differentiable proxies for end-to-end backpropagation, in some examples. In some embodiments, a quantizer which rounds to integer values at inference time can be proxied during training by $Q(U)=U+W$, where W is iid unif(−0.5, 0.5). In some embodiments, for instance, as the number of bits in the entropy code for $U=[u_{m,c}]$, the training proxy $$R(U)=-\sum_{m,c}\log_2 p_{\phi_{l,c}}(u_{m,c}) \quad (10)$$

can be used with $$p_{\phi_{l,c}}(u)=CDF_{\phi_{l,c}}(u+0.5)-CDF_{\phi_{l,c}}(u-0.5) \quad (11)$$

where the CDF is modeled by a neural network with parameters $\phi_{i,c}$ that can depend on the channel c and the level l. In some embodiments, a Run-Length Golomb-Rice code can be used at inference time.

Example Results

Figure 6:
FIG. 6 depicts an example comparison of results of an example compression pipeline according to example embodiments of the present disclosure in view of baselines.

FIG. 6 depicts images and measurements of a compressed voxelized point cloud produced by two baselines and an example embodiment of the present disclosure (the "Example Embodiment") with signal-to-noise ratios (SNRs) at three different target bitrates: approximately 0.125 bits per point (bpp), 0.5 bpp, and 1 bpp. In the Example Embodiment, the reference dataset includes a human body voxelized point cloud derived from a mesh. In the Example Embodiment, a voxel is occupied if any part of the mesh intersects it, and the color of that voxel is the average color of the mesh within the voxel. Integer voxel coordinates are used as the point positions. The voxels (and hence the point positions) have 10-bit resolution. This results in an octree of depth 10, or alternatively a binary tree of depth 30, for every point cloud. Point clouds are visualized in Meshlab. The coordinate-based network in the Example Embodiment is a 35×256×3 multilayer perceptron.

The Example Embodiment is implemented in Python using Tensorflow™. The learnable parameters included the latent representations, step size parameters, an entropy model per binary level, and a coordinate-based network at the top or leaf level. The entire point cloud constitutes one batch. The Example Embodiment is trained in about 25,000 steps using the Adam optimizer and a learning rate of 0.01.

The baselines are each a variant of region-adaptive linear transform (RAHT) coding, which is used in the "geometry-based" point cloud compression standard MPEG G-PCC, coupled with the adaptive Run-Length Golomb-Rice (RLGR) entropy coder. RAHT employs a tree structure, but the tree runs until the leaves are at the voxel level, such that the point colors are directly associated with a corresponding leaf voxel. From this hard-coded beginning, RAHT directly derives difference coefficients from the given color values, with the coefficients being conditioned on the geometry of the points in a top-down approach based on split blocks containing child blocks being assigned a value based on the point-weighted values of the child blocks. The resulting coefficients are uniformly scalar quantized with step sizes $2^n$, for n=0, . . . , 10. The quantized coefficients are concatenated by level from the root to the voxel leaves and entropy coded using RLGR independently for each color component. Baseline performances are provided using the RGB color space and the YUV (BT.709) color space (indicated by "RAHT-RGB" and "RAHT-YUV," respectively).

Example Devices and Systems

Figure 7A:
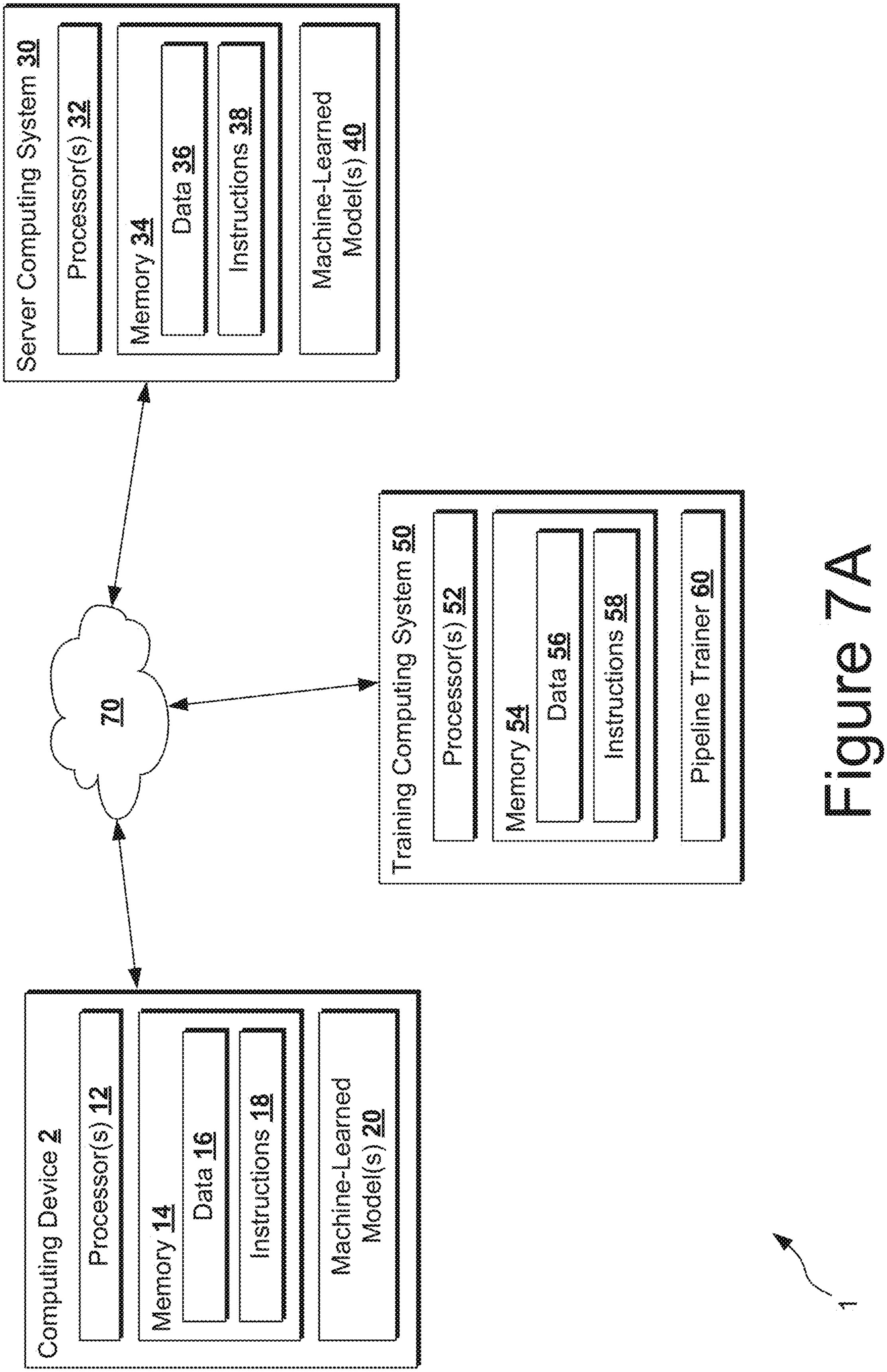
FIG. 7A depicts a block diagram of an example computing system that can implement an example compression pipeline according to example embodiments of the present disclosure.

FIG. 7A depicts a block diagram of an example computing system 1 that can implement a codec having a compression pipeline according to example embodiments of the present disclosure. The system 1 includes a computing device 2, a server computing system 30, and a training computing system 50 that are communicatively coupled over a network 70.

The computing device 2 can be any type of computing device, such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. In some embodiments, the computing device 2 can be or otherwise include or interface with rendering devices for rendering volumetric (or hypervolumetric) data, such as rendering point clouds (e.g., on a two-dimensional display or in simulated or actual three-dimensional representations). In some embodiments, the computing device 2 can be or otherwise include or interface with capture devices for capturing volumetric (or hypervolumetric) data, such as capturing point clouds (e.g., with radar, lidar, or other sensor arrays). In some embodiments, the computing device 2 can be or otherwise include or interface with generative or simulation devices for generating or otherwise simulating volumetric (or hypervolumetric) data, such as generating or otherwise simulating point clouds.

The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations.

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). In some embodiments, machine-learned model 20 includes a coordinate-based network of a decoder (e.g., of a compression pipeline 200, 500, etc.).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20 (e.g., to perform parallel attribute representation across multiple instances of a decoder).

Additionally, or alternatively, one or more machine-learned models 40 can be included in or otherwise stored and implemented by the server computing system 30 that communicates with the computing device 2 according to a client-server relationship. For example, the machine-learned models 40 can be implemented by the server computing system 40 as a portion of a web service (e.g., a dataset compression service, such as to provide to the computing device 2 one or more compressed versions of a given dataset for distribution). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some embodiments, the computing device 2 can be configured to implement one or more portions of a codec including an attribute compression pipeline according to example aspects of the present disclosure. For instance, the computing device 2 can contain a reference dataset in memory 14, and the computing device can implement a codec including an attribute compression pipeline as disclosed herein to compress attributes for storage (e.g., on device or on another device), transmission via network 70 (e.g., streaming, download, upload), etc. In some embodiments, an encoder portion of the compression pipeline is located on another device in communication with the computing device 2 (e.g., over network 70, such as the server computing device 30), and the computing device 2 can be configured to implement a decoder portion of the compression pipeline for receiving encoded datasets and generating representations thereof according to example aspects of the present disclosure. In some embodiments, a decoder portion of the compression pipeline is located on another device in communication with the computing device 2 (e.g., over network 70, such as the server computing device 30), and the computing device 2 can be configured to implement an encoder portion of the compression pipeline for generating encoded datasets for decoding by the other device(s).

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 130 includes plural server computing devices, such server computing devices can operate according to sequential computing architectures, parallel computing architectures, or some combination thereof. In some embodiments, the server computing system 30 can be or otherwise include or interface with rendering devices for rendering volumetric (or hypervolumetric) data, such as rendering point clouds (e.g., on a two-dimensional display or in simulated or actual three-dimensional representations). In some embodiments, the server computing system 30 can be or otherwise include or interface with capture devices for capturing volumetric (or hypervolumetric) data, such as capturing point clouds (e.g., with radar, lidar, or other sensor arrays). In some embodiments, the server computing system 30 can be or otherwise include or interface with generative or simulation devices for generating or otherwise simulating volumetric (or hypervolumetric) data, such as generating or otherwise simulating point clouds.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). In some embodiments, machine-learned model(s) 40 includes a coordinate-based network of a decoder (e.g., of a compression pipeline 200, 500, etc.).

In some embodiments, the server computing system 30 can be configured to implement one or more portions of a codec including an attribute compression pipeline according to example aspects of the present disclosure. For instance, the server computing system 30 can contain a reference dataset in memory 34, and the server computing system 30 can implement a codec including an attribute compression pipeline as disclosed herein to compress attributes for storage (e.g., on the system or on another device), transmission via network 70 (e.g., streaming, download, upload), etc. In some embodiments, an encoder portion of the compression pipeline is located on another device in communication with the server computing system 30 (e.g., over network 70, such as the computing device 2), and the server computing system 30 can be configured to implement a decoder portion of the compression pipeline for receiving encoded datasets and generating representations thereof according to example aspects of the present disclosure. In some embodiments, a decoder portion of the compression pipeline is located on another device in communication with the server computing system 30 (e.g., over network 70, such as the computing device 2), and the server computing system 30 can be configured to implement an encoder portion of the compression pipeline for generating encoded datasets for decoding by the other device(s).

The computing device 2 or the server computing system 30 can train example embodiments of the compression pipeline (e.g., pipeline 200, 500, etc.), including models 20 or 40. In some embodiments, the computing device 2 or the server computing system 30 can train example embodiments of the compression pipeline (e.g., pipeline 200, 500, etc.), including models 20 or 40 via interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations. In some implementations, the training computing system 50 includes or is otherwise implemented by one or more server computing devices.

The training computing system 50 can include a pipeline trainer 60 that trains example embodiments of the compression pipeline according to aspects of the present disclosure (e.g., pipeline 200, 500, etc.), including the latent representations (e.g., component latent representations, representations thereof, etc., such as, e.g., V, U, or $\hat{U}$), parameters of the coordinate-based network (e.g., θ), or other parameters of the pipeline (e.g., domain-based transform parameters, such as a step size parameter or other scaling parameters; parameters of a quantizer or entropy coder; etc.). Parameters of the compression pipeline(s) can be trained, in some embodiments, using various training or learning techniques, such as, for example, backwards propagation of errors. For example, a loss function (e.g., based on a rate-distortion metric, such as a Lagrangian rate-distortion metric) can be backpropagated through the pipeline(s) to update one or more parameters of the pipeline(s) (e.g., based on a gradient of the loss function). Various other loss functions can be used such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pipeline trainer 60 can perform a number of generalization techniques (e.g., weight decays, dropouts, etc.) to improve the generalization capability of the models being trained.

The pipeline trainer 60 can include computer logic utilized to provide desired functionality. The pipeline trainer 60 can be implemented in hardware, firmware, or software controlling a general-purpose processor. For example, in some implementations, the pipeline trainer 60 includes program files stored on a storage device, loaded into a memory, and executed by one or more processors. In other implementations, the pipeline trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 7A illustrates one example computing system that can be used to implement the present disclosure. Other computing systems can be used as well. For example, in some implementations, the computing device 2 can include the pipeline trainer 60. In such implementations, a compression pipeline can be both trained and used locally at the computing device 2 (e.g., to learn compressed representations of attribute(s)). In some of such implementations, the computing device 2 can implement the pipeline trainer 60 to personalize the pipeline(s) based on device-specific data.

Figure 7B:
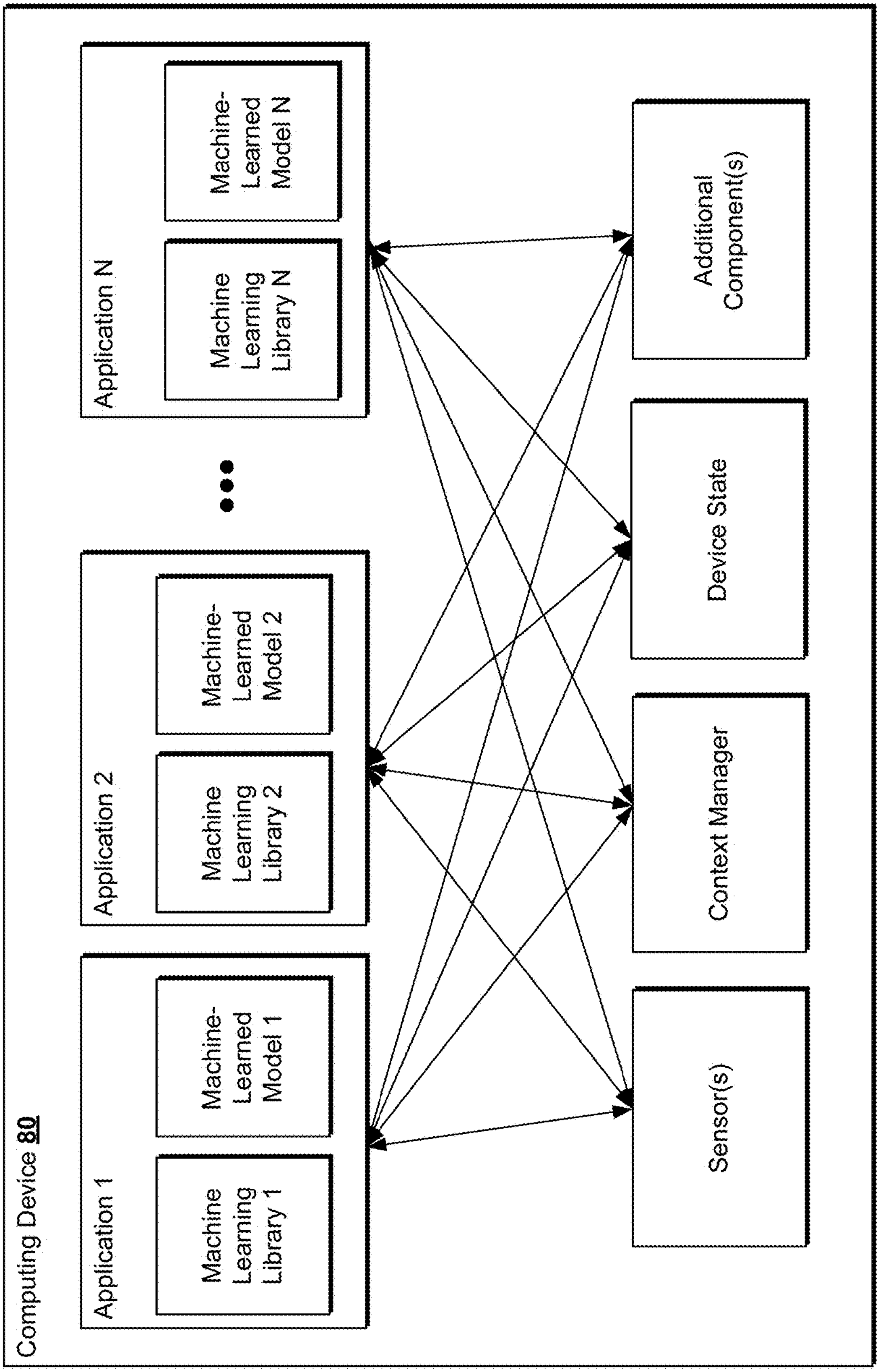
FIG. 7B depicts a block diagram of an example computing device that can implement an example compression pipeline according to example embodiments of the present disclosure.

FIG. 7B depicts a block diagram of an example computing device 80 that performs according to example embodiments of the present disclosure. The computing device 80 can be a user computing device or a server computing device. The computing device 80 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc. As illustrated in FIG. 7B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 7C:
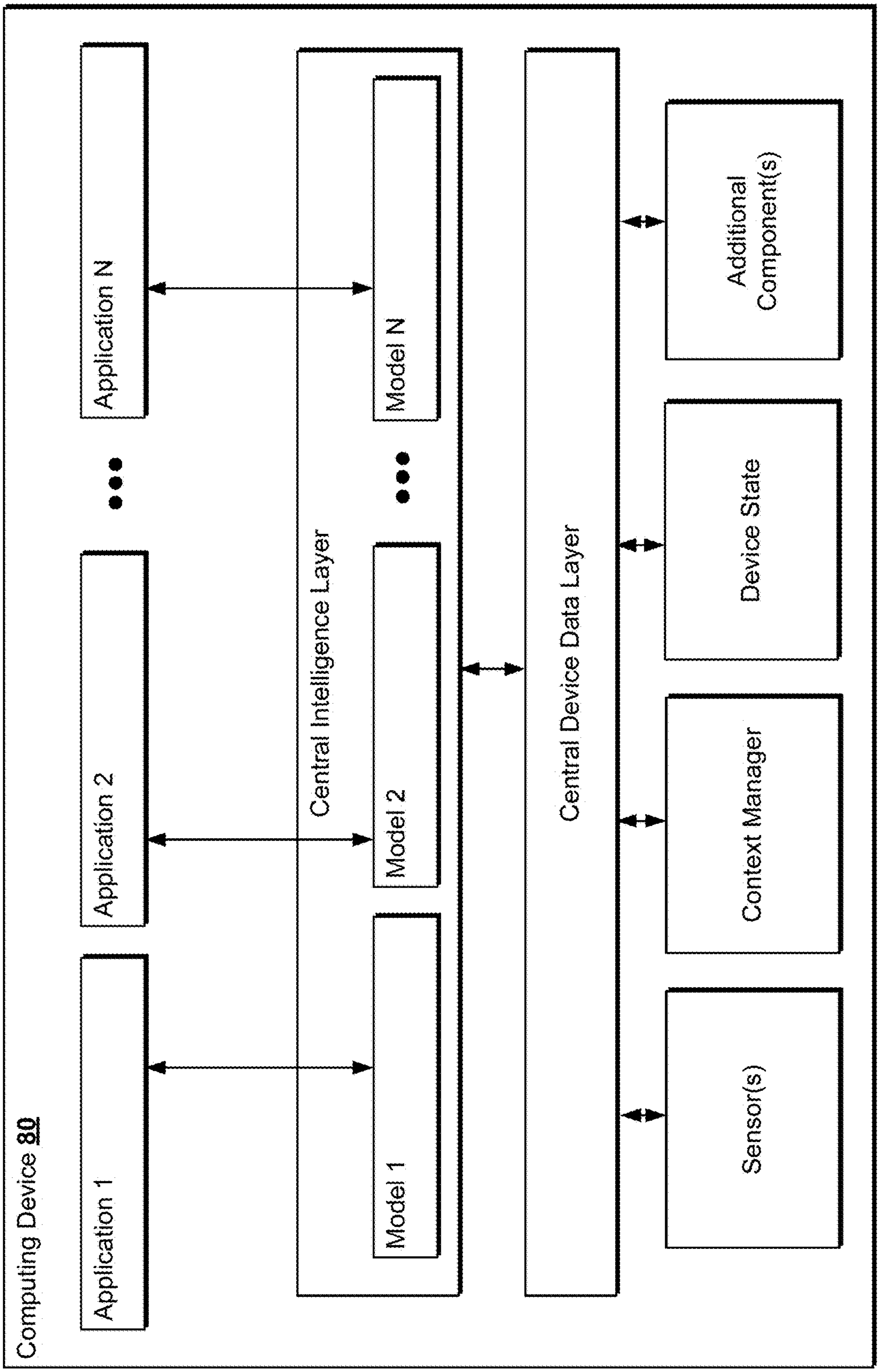
FIG. 7C depicts a block diagram of an example computing device that can implement an example compression pipeline according to example embodiments of the present disclosure.

FIG. 7C depicts a block diagram of an example computing device 80 that performs according to example embodiments of the present disclosure. The computing device 80 can be a user computing device or a server computing device. The computing device 80 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 7C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

Figure 8:
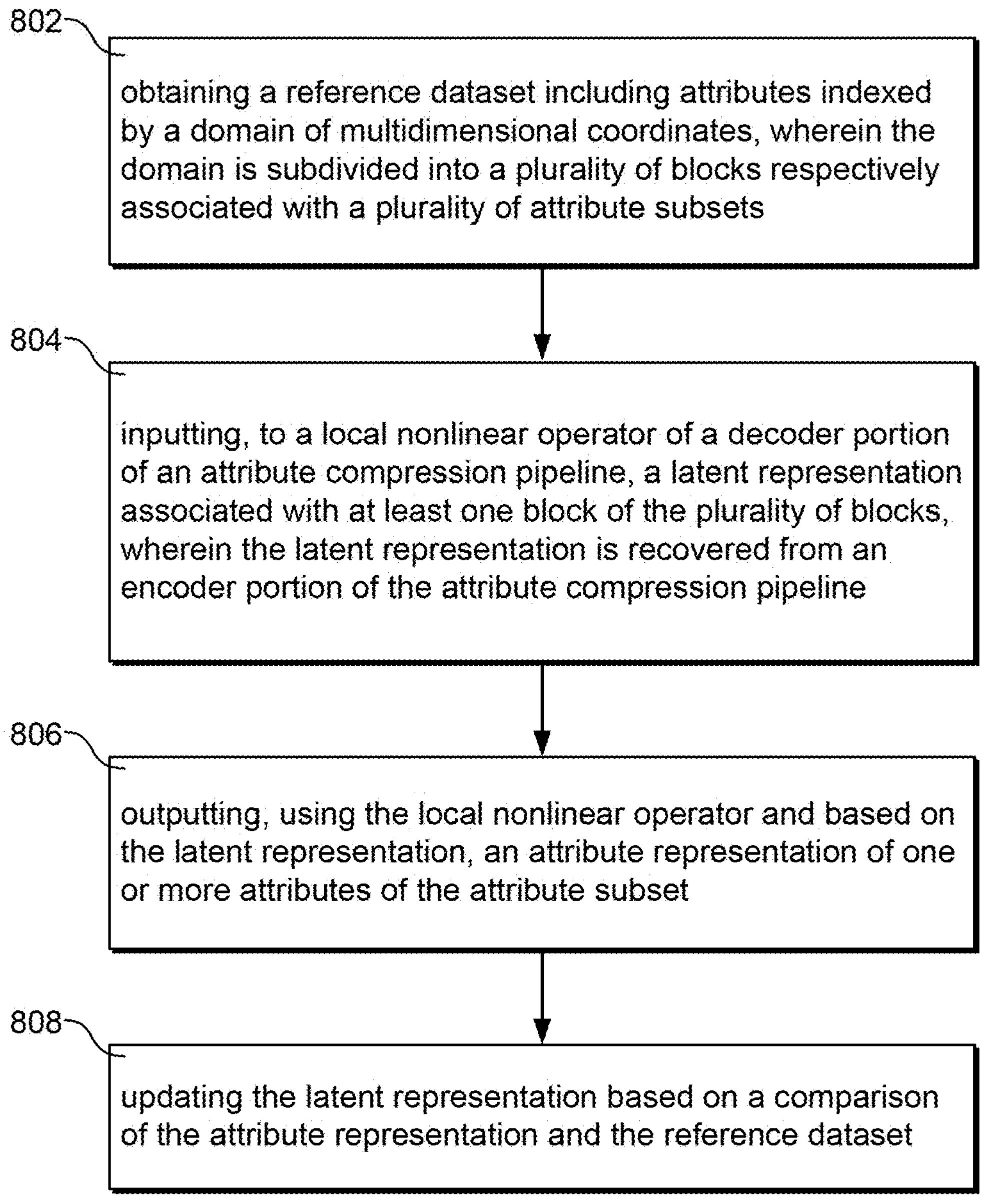
FIG. 8 depicts a flow chart diagram of an example method to implement an example compression pipeline according to example embodiments of the present disclosure.

FIG. 8 depicts a flow chart diagram of an example method 800 to perform according to example embodiments of the present disclosure. Although FIG. 8 depicts operations performed in a particular order for purposes of illustration and discussion, the methods of the present disclosure are not limited to the particularly illustrated order or arrangement. The various operations of example method 800 can be omitted, rearranged, combined, or adapted in various ways without deviating from the scope of the present disclosure. In some embodiments, one or more operations of example method 800 can be implemented using any one or more of the computing systems described herein (e.g., computing device 2, server computing system 30, training computing system 50, etc.).

At 802, example method 800 can include obtaining a reference dataset including attributes indexed by a domain of multidimensional coordinates. For example, the reference dataset can include a geometric domain (e.g., a point cloud defining geometry of one or more objects). The attributes (e.g., attributes 106) can include characteristics associated with locations in the domain (e.g., domain 104). For instance, a point cloud domain can have corresponding color values associated with the points for defining a three-dimensional model or other imaging of an object. In some embodiments, the domain is subdivided into a plurality of blocks respectively associated with a plurality of attribute subsets. For example, FIGS. 3 and 4 provide example illustrations of subdividing a domain into blocks. A respective block can be associated with multiple locations in the domain (e.g., multiple voxels of a volumetric domain) and the attributes associated with those locations (e.g., as a subset of the set of all attributes). In this manner, for instance, each block can correspond to a local domain (e.g., a subdomain) and local attribute subset.

At 804, example method 800 can include inputting, to a coordinate-based network of a decoder portion of an attribute compression pipeline, a latent representation associated with at least one block of the plurality of blocks. For example, an attribute compression pipeline can include a pipeline such as described with respect to FIGS. 1, 2, and 5 (e.g., pipeline 200, pipeline 500, etc.), and the decoder portion can include an attribute decoder 118 with a coordinate-based network 220. In some embodiments, the latent representation is recovered from an encoder portion of the attribute compression pipeline. For example, the encoder portion can include an attribute encoder 112 (e.g., of pipeline 200, pipeline 500, etc.). The latent representation associated with the at least one block can include, for example, latent representations 222 and/or latent representations 524.

At 806, example method 800 can include outputting, using the coordinate-based network and based on the latent representation, an attribute representation of one or more attributes of the attribute subset. For example, the coordinate-based network can learn a functional mapping between an input coordinate space and an attribute space. A latent representation (e.g., the latent representation input at 804) can provide context to the coordinate-based network to localize the mapping for mapping within a particular block associated with the latent representation. In some embodiments, the output attribute representation can be a reconstruction of the corresponding attributes in the reference dataset for a given input location. For instance, if a reference attribute includes a color value for a particular location in the domain, the output attribute representation can include that color value, such as an estimate or approximation thereof reconstructed via the compression pipeline.

At 808, example method 800 can include updating the latent representation based on a comparison of the attribute representation and the reference dataset. For example, the attribute representation can be compared to a corresponding attribute of the reference dataset (e.g., corresponding to a given location). In some embodiments, attribute representations can be compared to the reference dataset on a point-by-point basis. In some embodiments, attribute representations can be compared to the reference dataset in batches. For instance, in some embodiments, a reference dataset can include three-dimensional imagery (e.g., a point cloud or model of a form or object). A set of attribute representations for some or all of the domain of the reference dataset can be obtained and compared as a group with the reference. For instance, a perceptual quality metric can be used to compare the reference dataset (e.g., a rendering of a model described by the reference dataset, etc.) to a representation thereof (e.g., a rendering of a model described by the set of attribute representations, etc.). Based on a comparison of the attribute representation and the reference dataset, the latent representation can be updated (e.g., to improve the attribute representation(s), etc.).

For example, in some embodiments, the latent representation can be updated based on a loss propagated through the compression pipeline. For instance, in some embodiments, the compression pipeline can be differentiable, and a loss can be backpropagated through the pipeline to update the latent representation(s). In some embodiments, the loss can be based on or otherwise include a distortion metric or a rate-distortion metric.

In some embodiments, the coordinate-based network includes learnable parameters that can optionally be updated with the latent representation (e.g., jointly learned). In some embodiments, the coordinate-based network includes learnable parameters shared across the plurality of blocks. For example, the coordinate-based network can generate a first attribute representation with a first latent representation (e.g., for a location in a first block) and generate a second attribute representation with a second latent representation (e.g., for a location in a second block) using one or more same parameters.

In some embodiments, the latent representation input at 804 is based on (e.g., assembled from) a plurality of component latent representations. In some embodiments, the latent representation is updated by updating the upstream component latent representations. For example, as described with respect to FIGS. 4 and 5, a plurality of component latent representations can be configured to be combined to obtain a latent representation associated with a given block (e.g., latent representations 524). For example, a plurality of blocks can include overlapping blocks that are each associated with the attribute subset, and the overlapping blocks can be respectively associated with one or more of the plurality of component latent representations.

In some embodiments, an encoder portion of the compression pipeline (e.g., pipeline 200, pipeline 500, etc.) can output a plurality of component latent representations. For example, the component latent representations can be entropy coded for decreased data rates (e.g., for transmission, storage, etc.). An encoder portion of the compression pipeline (e.g., attribute encoder 112) can learn the component latent representations (e.g., component representations 512) for subsequent processing by a decoder portion (e.g., attribute decoder 118).

In some embodiments, component latent representations can be learned by an encoder portion of the compression pipeline and subjected to domain-based transforms for data compression. For instance, an example data compression technique can be quantization (e.g., rounding to integer values). A domain-based transform can include scaling the value(s) of the component latent representations learned by the encoder portion such that, when quantized, value(s) of component latent representations associated with blocks of greater weight (e.g., containing more points, denser/finer geometry, etc.) are quantized at a greater bit depth. In some embodiments, the domain-based transforms can be parameterized with one or more learnable parameters. For instance, a learnable step size parameter can be configured to scale one or more values of a latent representation (e.g., a component latent representation 512).

Figure 9:
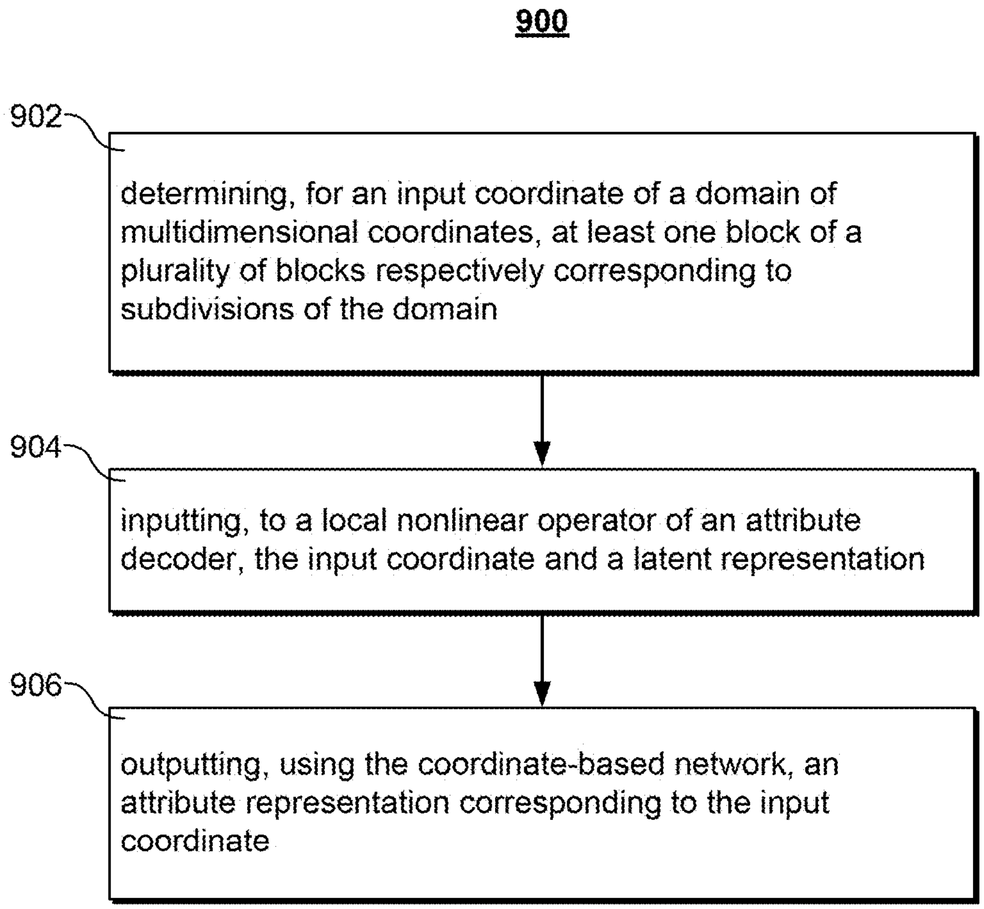
FIG. 9 depicts a flow chart diagram of an example method to obtain attribute representations according to example embodiments of the present disclosure.

FIG. 9 depicts a flow chart diagram of an example method 900 to perform according to example embodiments of the present disclosure. Although FIG. 9 depicts operations performed in a particular order for purposes of illustration and discussion, the methods of the present disclosure are not limited to the particularly illustrated order or arrangement. The various operations of example method 900 can be omitted, rearranged, combined, or adapted in various ways without deviating from the scope of the present disclosure. In some embodiments, one or more operations of example method 900 can be implemented using any one or more of the computing systems described herein (e.g., computing device 2, server computing system 30, training computing system 50, etc.).

At 902, example method 900 can include determining, for an input coordinate of a domain of multidimensional coordinates, at least one block of a plurality of blocks respectively corresponding to subdivisions of the domain. For example, the domain of multidimensional coordinates can correspond to points of a point cloud. In some embodiments, the domain can be subdivided into blocks, and the input coordinate can be situated in at least one block (e.g., as described with respect to FIGS. 3 and 4).

At 904, example method 900 can include inputting, to a coordinate-based network of an attribute decoder, the input coordinate and a latent representation. For example, the coordinate-based network can learn a functional mapping between an input coordinate space and an attribute space. A latent representation can provide context to the coordinate-based network to localize the mapping for mapping within a particular block associated with the latent representation. In some embodiments, the output attribute representation can be a reconstruction of the corresponding attributes in a reference dataset for a given input location. For instance, if a reference attribute includes a color value for a particular location in the domain, the output attribute representation can include that color value, such as an estimate or approximation thereof reconstructed via the compression pipeline.

In some embodiments, the latent representation is obtained from a plurality of recovered component latent representations based on or otherwise associated with the at least one block. For example, as described with respect to FIGS. 4 and 5, a plurality of component latent representations can be configured to be combined to obtain a latent representation associated with a given block (e.g., latent representations 524). For example, a plurality of blocks can include overlapping blocks that are each associated with the attribute subset, and the overlapping blocks can be respectively associated with one or more of the plurality of component latent representations.

In some embodiments, the recovered component latent representations are recovered using a domain-based transform. For instance, a domain-based transform (e.g., reverse transforms 520) can scale one or more values of the component latent representations according to a weight associated with a block corresponding to the component latent representations (e.g., a greater weight corresponding to more points, denser/finer geometry, etc.). In some embodiments, the domain-based transforms can be parameterized with one or more learnable parameters. For instance, a learnable step size parameter can be configured to scale one or more values of a latent representation.

At 906, example method 900 can include outputting, using the coordinate-based network, an attribute representation corresponding to the input coordinate. For example, an input coordinate can be a point in a point cloud, and the attribute representation can include one or more characteristics of the point (e.g., color, reflectance, etc.). In this manner, for instance, compressed attributes can be recovered and mapped to their corresponding points.

Figure 10:
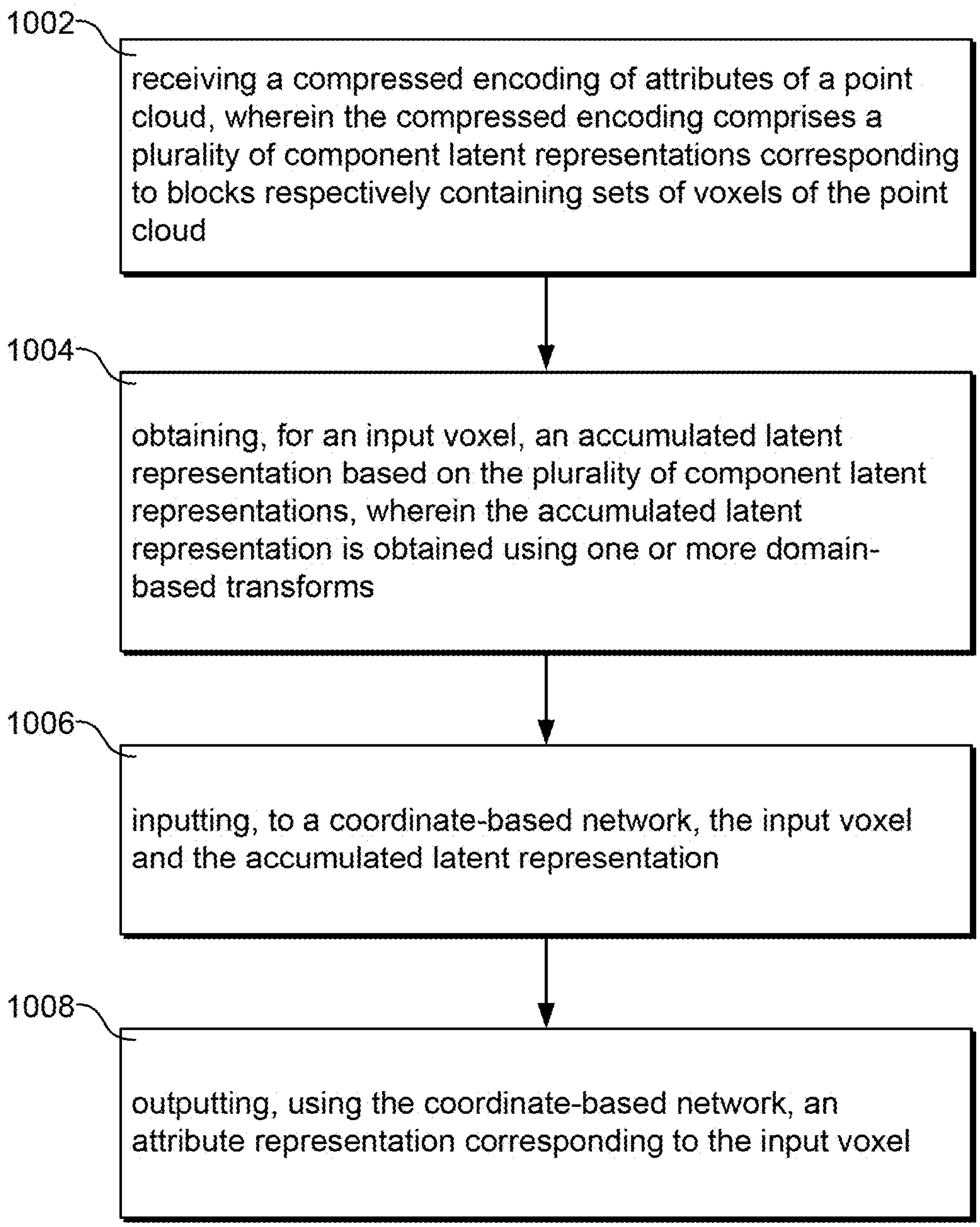
FIG. 10 depicts a flow chart diagram of an example method to obtain attribute representations according to example embodiments of the present disclosure.

FIG. 10 depicts a flow chart diagram of an example method 1000 to perform according to example embodiments of the present disclosure. Although FIG. 10 depicts operations performed in a particular order for purposes of illustration and discussion, the methods of the present disclosure are not limited to the particularly illustrated order or arrangement. The various operations of example method 1000 can be omitted, rearranged, combined, or adapted in various ways without deviating from the scope of the present disclosure. In some embodiments, one or more operations of example method 1000 can be implemented using any one or more of the computing systems described herein (e.g., computing device 2, server computing system 30, training computing system 50, etc.).

At 1002, example method 1000 can include receiving a compressed encoding of attributes of a point cloud, wherein the compressed encoding includes a plurality of component latent representations corresponding to blocks respectively containing sets of voxels of the point cloud.

At 1004, example method 1000 can include obtaining, for an input voxel, an accumulated latent representation based on the plurality of component latent representations, wherein the accumulated latent representation is obtained using one or more domain-based transforms. For example, in some embodiments, the accumulated latent representation is obtained by combining a plurality of component latent representations (e.g., as described with respect to FIGS. 3, 4, and 5).

At 1006, example method 1000 can include inputting, to a coordinate-based network, the input voxel and the accumulated latent representation.

At 1008, example method 1000 can include outputting, using the coordinate-based network, an attribute representation corresponding to the input voxel.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Also, terms such as "based on" should be understood as "based at least in part on."

What is claimed is:

1. A computing system, comprising:

one or more processors; and one or more non-transitory computer-readable media storing instructions that are executable by the one or more processors to cause the computing device to perform operations, the operations comprising:

receiving a compressed encoding of attributes of a point cloud, wherein the compressed encoding comprises a plurality of component latent representations corresponding to blocks respectively containing sets of voxels of the point cloud;

obtaining, for an input voxel, an input latent representation based on the plurality of component latent representations;

generating, using a coordinate-based network and based on the input latent representation, an attribute representation corresponding to the input voxel, wherein the coordinate-based network receives, as an input, a coordinate of interest, and returns, as an output, an attribute value associated with the coordinate of interest, the coordinate-based network comprising parameters learned for a particular reference dataset describing three-dimensional imagery or parameters generalized across multiple reference datasets; and rendering an augmented reality image or a virtual reality image using the generated attribute representation.

2. The computing system of claim 1, wherein the computing device is a wearable computing device.

3. The computing system of claim 1, wherein rendering an augmented reality image or a virtual reality image using the generated attribute representation comprises:

rendering volumetric data in a simulated three-dimensional representation.

4. The computing system of claim 1, wherein the operations comprise:

processing compressed encoding using a decoder portion of an attribution compression codec, wherein the decoder portion obtains the input latent representation and generates the attribute representation.

5. The computing system of claim 1, wherein the attribute value is a color value.

6. The computing system of claim 1, wherein the coordinate-based network comprises the parameters that are learned for a particular reference dataset describing three-dimensional imagery.

7. The computing system of claim 1, wherein the coordinate-based network comprises the parameters that are generalized across multiple reference datasets.

8. The computing system of claim 1, wherein the operations comprise:

determining an input coordinate of a domain of multidimensional coordinates that corresponds to the voxel;

determining, for the input coordinate, at least one block of a plurality of blocks respectively corresponding to subdivisions of the domain; and obtaining the input latent representation from a plurality of recovered component latent representations based on the at least one block.

9. The computing system of claim 1, wherein the plurality of recovered component latent representations are recovered from a compressed encoding of a corresponding plurality of component latent representations, wherein the corresponding plurality of component latent representations were machine-learned as part of an attribute compression pipeline comprising the coordinate-based network.

10. The computing system of claim 1, wherein:

the at least one block comprises overlapping blocks that each contain the input coordinate; and the overlapping blocks are respectively associated with one or more of the plurality of recovered component latent representations.

11. The computing system of claim 10, wherein the overlapping blocks are configured in layers, wherein components of the plurality of components respectively associated with blocks of a first layer are difference vectors defined with respect to another component of the plurality of components associated with an underlying block of a second layer.

12. A computing system comprising:

one or more processors; and one or more non-transitory computer-readable media storing instructions that are executable by the one or more processors to cause the computing system to perform operations, the operations comprising:

encoding a reference attribute at an input coordinate of a domain of multidimensional coordinates using an encoder portion of a compression pipeline, wherein the encoder portion comprises an attribute encoder that learns latent representations that are configured for input to a coordinate-based network of an attribute decoder, wherein the latent representations are configured to cause the coordinate-based network to generate a representation of the reference attribute in association with the input coordinate; and streaming the latent representations to a computing device that is configured to execute a decoder portion of the compression pipeline that comprises the attribute decoder.

13. The computing system of claim 12, wherein the computing device is an augmented reality or virtual reality computing device.

14. The computing system of claim 12, wherein the reference attribute comprises at least one of: a color, a signed distance, a reflectance, a normal, a transparency, a density, or a spherical harmonic.

15. The computing system of claim 12, wherein the reference attribute is associated with a point of a point cloud, the point indexed at the input coordinate.

16. The computing system of claim 12, wherein the reference attribute is encoded by:

obtaining a reference dataset comprising attributes indexed by the domain of multidimensional coordinates, wherein the domain is subdivided into a plurality of blocks respectively associated with a plurality of attribute subsets;

inputting, to an instance of the coordinate-based network of the decoder portion of the compression pipeline, an initial latent representation associated with at least one block of the plurality of blocks;

outputting, using the coordinate-based network and based on the initial latent representation, an initial attribute representation of one or more attributes of the attribute subset; and updating the initial latent representation based on a comparison of the attribute representation and the reference dataset.

17. A computing system comprising:

one or more processors; and one or more non-transitory computer-readable media storing instructions that are executable by the one or more processors to cause the computing system to perform operations, the operations comprising:

streaming one or more latent representations from a server computing system that is configured to execute an encoder portion of a compression pipeline, wherein the encoder portion comprises an attribute encoder that learns latent representations that are configured for input to a coordinate-based network of an attribute decoder, wherein the latent representations are configured to cause the coordinate-based network to generate a representation of the reference attribute in association with the input coordinate; and executing a decoder portion of the compression pipeline to process the one or more latent representations to generate a representation of a reference attribute at an input coordinate.

18. The computing system of claim 17, wherein the computing system comprises an augmented reality or virtual reality computing device.

19. The computing system of claim 17, wherein the reference attribute comprises at least one of: a color, a signed distance, a reflectance, a normal, a transparency, a density, or a spherical harmonic.

20. The computing system of claim 17, wherein the decoder portion comprises the coordinate-based network to receive, as an input, a coordinate of interest, and return, as an output, an attribute value associated with the coordinate of interest.

* * * * *